US012283025B2

(12) United States Patent
Matsuoka et al.

(10) Patent No.: US 12,283,025 B2
(45) Date of Patent: Apr. 22, 2025

(54) IMAGE GENERATION APPARATUS, CONTROL METHOD, AND NON-TRANSITORY RECORDING MEDIUM

(71) Applicant: SHARP KABUSHIKI KAISHA, Osaka (JP)

(72) Inventors: Teruhiko Matsuoka, Sakai (JP); Masahiko Takashima, Sakai (JP); Daisaku Imaizumi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 341 days.

(21) Appl. No.: 17/886,265

(22) Filed: Aug. 11, 2022

(65) Prior Publication Data

US 2023/0057757 A1    Feb. 23, 2023

(30) Foreign Application Priority Data

Aug. 19, 2021    (JP) .................................. 2021-134384

(51) Int. Cl.
  *G06T 5/00*    (2024.01)
(52) U.S. Cl.
  CPC ...... *G06T 5/00* (2013.01); *G06T 2207/10024* (2013.01); *G06T 2207/20021* (2013.01); *G06T 2207/20224* (2013.01)
(58) Field of Classification Search
  CPC ............. G06T 5/00; G06T 2207/10024; G06T 2207/20021; G06T 2207/20224; H04N 1/644
  See application file for complete search history.

(56) References Cited

U.S. PATENT DOCUMENTS

| | | | |
|---|---|---|---|
| 9,894,298 B1* | 2/2018 | Solh | H04N 23/45 |
| 2005/0185000 A1 | 8/2005 | Nonaka | |
| 2012/0307270 A1* | 12/2012 | Nakajima | H04N 1/56 358/1.9 |
| 2015/0256715 A1* | 9/2015 | Ikari | H04N 1/4095 358/3.24 |
| 2019/0045087 A1* | 2/2019 | Shimamura | H04N 1/62 |
| 2019/0394357 A1* | 12/2019 | Sugahara | H04N 1/0097 |
| 2020/0105027 A1* | 4/2020 | Kobayashi | G06T 5/77 |
| 2022/0092836 A1* | 3/2022 | Suzuki | G06T 11/60 |

FOREIGN PATENT DOCUMENTS

| | | | |
|---|---|---|---|
| JP | 2003134532 A | 5/2003 | |
| JP | 2005-236653 A | 9/2005 | |
| JP | 2006229280 A | 8/2006 | |
| JP | 2015-060315 A | 3/2015 | |

\* cited by examiner

*Primary Examiner* — Tom Y Lu
(74) *Attorney, Agent, or Firm* — ScienBiziP, P.C.

(57) ABSTRACT

Provided are a memory and a processor connected to the memory to execute a program stored in the memory. The processor classifies each of pixels included in an image into any one region of a region of achromatic color and a region of chromatic color inside a color space, uses the pixels classified into the region of achromatic color to extract a first predetermined number of representative colors, uses the pixels classified into the region of chromatic color to extract a second predetermined number of representative colors, and replaces each of the pixels included in the image with a pixel of a representative color having a smallest difference in pixel value from the pixels included in the image, among the first predetermined number of representative colors and the second predetermined number of representative colors, to generate a color-reduced image of the image.

11 Claims, 25 Drawing Sheets

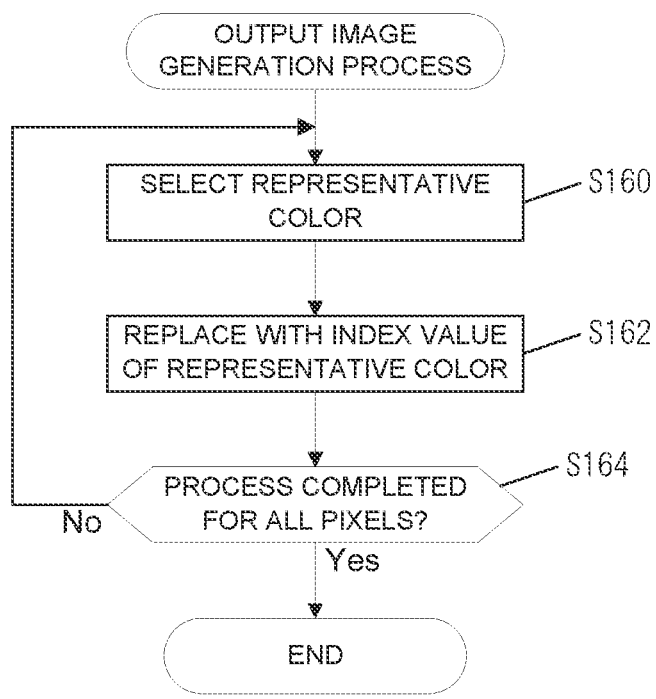

FIG. 12A

| REGION | MAXIMUM VALUE | MINIMUM VALUE | ABSOLUTE DIFFERENCE VALUE | |
|---|---|---|---|---|
| ACHROMATIC COLOR 1 | 40 | 10 | 30 | ←D140 |
| CHROMATIC COLOR 1 (L*) | 200 | 20 | 180 | ←D142 |
| CHROMATIC COLOR 1 (a*) | 50 | 20 | 30 | ←D144 |
| CHROMATIC COLOR 1 (b*) | 40 | 5 | 35 | ←D146 |
| CHROMATIC COLOR 2 (L*) | 180 | 100 | 80 | |
| CHROMATIC COLOR 2 (a*) | 50 | 10 | 40 | |
| CHROMATIC COLOR 2 (b*) | 100 | 80 | 20 | |
| ⋮ | ⋮ | ⋮ | ⋮ | |
| CHROMATIC COLOR 8 (L*) | 160 | 120 | 40 | |
| CHROMATIC COLOR 8 (a*) | 100 | 80 | 20 | |
| CHROMATIC COLOR 8 (b*) | −10 | 50 | 40 | |

FIG. 13A

| DOCUMENT TYPE | COLOR MODE | COLOR REDUCTION NUMBER | NUMBER OF ACHROMATIC COLORS | DIVISION ANGLE OF RADIALLY DIVIDED REGION | THRESHOLD VALUE (TH1) |
|---|---|---|---|---|---|
| AUTO | MONOCHROME | 8 | 8 | 45, 90, 124, 180, 225, 270, 315, 360 | 5 |
| AUTO | COLOR | 20 | 5 | 30, 75, 120, 165, 210, 255, 300, 345 | 5 |
| CHARACTER | MONOCHROME | 8 | 8 | 45, 90, 124, 180, 225, 270, 315, 360 | 5 |
| CHARACTER | COLOR | 18 | 4 | 30, 75, 120, 165, 210, 255, 300, 345 | 5 |
| CHARACTER AND PICTURE | MONOCHROME | 8 | 8 | 45, 90, 124, 180, 225, 270, 315, 360 | 4 |
| CHARACTER AND PICTURE | COLOR | 20 | 5 | 30, 75, 120, 165, 210, 255, 300, 345 | 4 |
| PRINTED PICTURE | MONOCHROME | 8 | 8 | 45, 90, 124, 180, 225, 270, 315, 360 | 6 |
| PRINTED PICTURE | COLOR | 20 | 5 | 30, 75, 120, 165, 210, 255, 300, 345 | 6 |
| CHARACTER AND PICTURE | MONOCHROME | 8 | 8 | 45, 90, 124, 180, 225, 270, 315, 360 | 4 |
| CHARACTER AND PICTURE | COLOR | 22 | 6 | 30, 75, 120, 165, 210, 255, 300, 345 | 4 |
| PICTURE | MONOCHROME | 8 | 8 | 45, 90, 124, 180, 225, 270, 315, 360 | 5 |
| PICTURE | COLOR | 22 | 6 | 30, 75, 120, 165, 210, 255, 300, 345 | 5 |
| MAP | MONOCHROME | 8 | 8 | 45, 90, 124, 180, 225, 270, 315, 360 | 5 |
| MAP | COLOR | 16 | 5 | 30, 75, 120, 165, 210, 255, 300, 345 | 5 |

D200

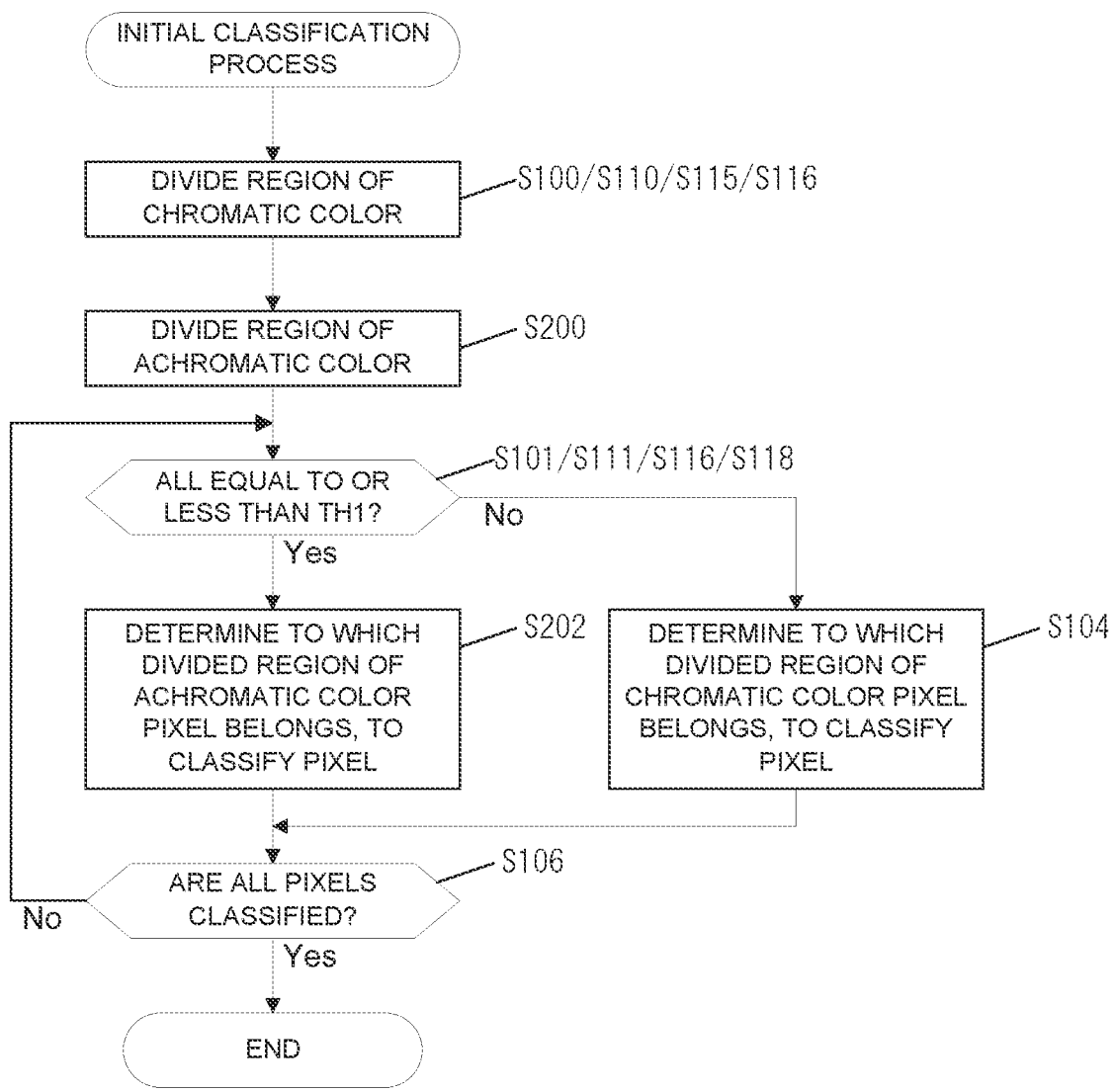

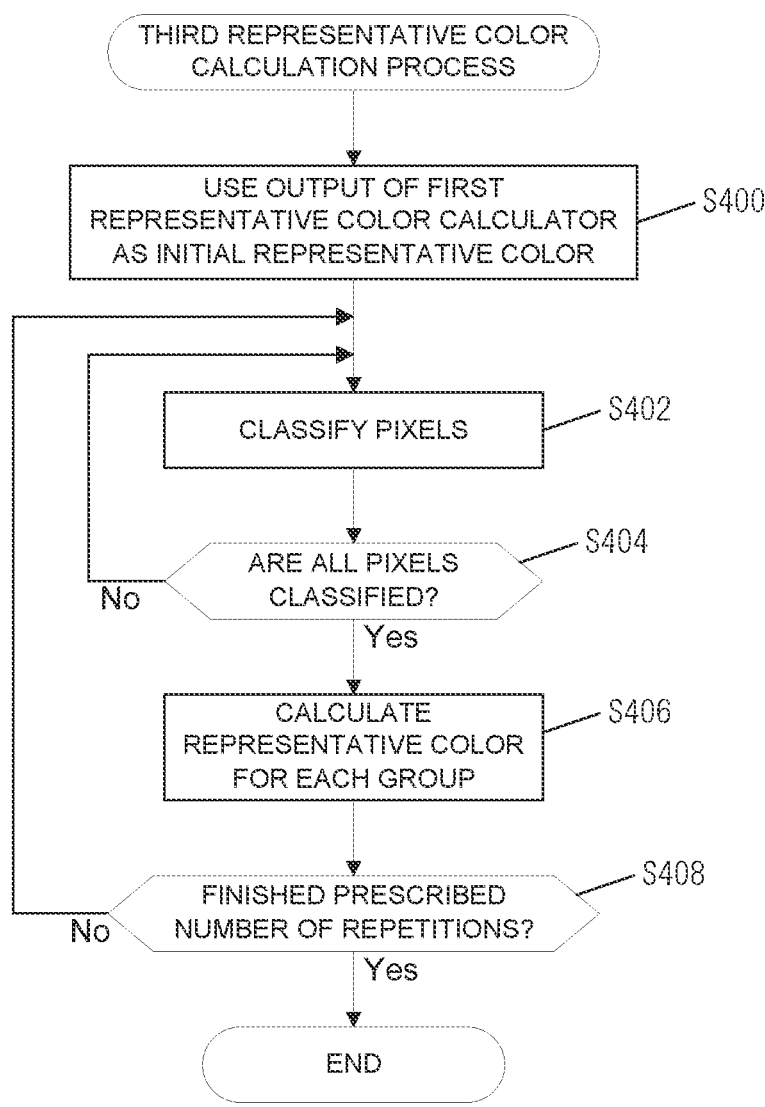

IMAGE GENERATION APPARATUS, CONTROL METHOD, AND NON-TRANSITORY RECORDING MEDIUM

BACKGROUND OF THE INVENTION

Field of the Invention

The present disclosure relates to an image generation apparatus and the like.

Description of the Background Art

Conventionally, techniques are utilized to execute a color reduction process for reducing the number of colors used in an image, to generate a file of a predetermined image format, or reduce a file size of the image format.

In addition, a technique for determining a color (a representative color) used in the image after color reduction has also been proposed. For example, there has been proposed a technique in which a color space is changed so that the length ratio of an R axis, a G axis, and a B axis in an RGB color space is 3:4:2, a color distribution is created in the changed color space, the color space is divided into a predetermined number of regions by the median cut method, based on the color distribution, and a representative color is selected for each of the divided regions. In addition, there has been proposed a technique in which an initial cluster is set for input image data converted into an L* a* b* color space, so that the input image data is evenly distributed in the L* a* b* color space, and a K-means algorithm is used to determine a representative color of the input image data.

Here, in general, the representative color is calculated from a predetermined region of the color space without distinguishing between chromatic colors and achromatic colors, and thus, the chromatic colors and achromatic colors mix, so that the chroma of the representative color may unfortunately decrease. Even if the initial cluster is set to be evenly distributed over the entire L* a* b* color space, there exists an unnecessary initial cluster, and thus, there is a problem in that additional processing time is required. These problems are not taken into consideration by conventional techniques.

In view of the above-mentioned problems, an object of the present disclosure is to provide an image generation apparatus and the like that classifies pixels in an image into pixels of achromatic color and pixels of chromatic color, and uses a calculated representative color to generate a color-reduced image.

SUMMARY OF THE INVENTION

To solve the above-described problems, an image generation apparatus according to the present disclosure includes a memory and a processor connected to the memory to execute a program stored in the memory, and the processor is characterized in that the processor classifies each of pixels included in an image into any one region of a region of achromatic color inside a color space and a region of chromatic color inside the color space, uses the pixels classified into the region of achromatic color to extract a first predetermined number of representative colors, uses the pixels classified into the region of chromatic color to extract a second predetermined number of representative colors, and replaces each of the pixels included in the image with a pixel of a representative color having a smallest difference in pixel value from the pixels included in the image, among the first predetermined number of representative colors and the second predetermined number of representative colors, to generate a color-reduced image of the image.

A control method according to the present disclosure is a control method of an image generation apparatus, and the control method is characterized in including classifying each of pixels included in an image into any one region of a region of achromatic color inside a color space and a region of chromatic color inside the color space, using the pixels classified into the region of achromatic color to extract a first predetermined number of representative colors, using the pixels classified into the region of chromatic color to extract a second predetermined number of representative colors, and replacing each of the pixels included in the image with a pixel of a representative color having a smallest difference in pixel value from the pixels included in the image, among the first predetermined number of representative colors and the second predetermined number of representative colors, to generate a color-reduced image of the image.

A non-transitory storage medium according to the present disclosure is characterized in causing a computer to realize functions of classifying each of pixels included in an image into any one region of a region of achromatic color inside a color space and a region of chromatic color inside the color space, using the pixels classified into the region of achromatic color to extract a first predetermined number of representative colors, using the pixels classified into the region of chromatic color to extract a second predetermined number of representative colors, and replacing each of the pixels included in the image with a pixel of a representative color having a smallest difference in pixel value from the pixels included in the image, among the first predetermined number of representative colors and the second predetermined number of representative colors, to generate a color-reduced image of the image.

According to the present disclosure, it is possible to provide an image generation apparatus and the like that classifies pixels in an image into pixels of achromatic color and pixels of chromatic color, and uses a calculated representative color to generate a color-reduced image.

BRIEF DESCRIPTION OF THE DRAWINGS

FIG. 11 is a flowchart for describing a flow of an output image generation process according to the first embodiment.

FIG. 12A and FIGS. 12B to 12D are a table and diagrams for describing operation examples according to the first embodiment.

FIG. 13A is a table showing an example of a data structure of a setting table in a second embodiment. FIG. 13B is a flowchart for describing a flow of an initial classification process according to the second embodiment.

FIG. 19 is a flowchart for describing a flow of a third representative color calculation process according to the fourth embodiment.

DESCRIPTION OF THE PREFERRED EMBODIMENTS

Embodiment for carrying out the present disclosure will be described below with reference to the drawings. The following embodiments are examples for describing the present disclosure, and the technical scope of the present disclosure described in the claims is not limited to the following description.

1. First Embodiment 1.1 Functional Configuration

A functional configuration of an image forming apparatus 1 will be described with reference to FIGS. 1 and 2. The image forming apparatus 1 is an apparatus capable of reading an image of a document, forming (printing) the read image on a recording medium such as recording sheet, and transmitting the read image to another apparatus to output the read image. For example, the image forming apparatus 1 is a digital multi-function printer (MFP; Multi-Function Printer/Peripheral) having a copying function, a printing function, a scanner function, a mail transmission function, and the like.

Figure 1:
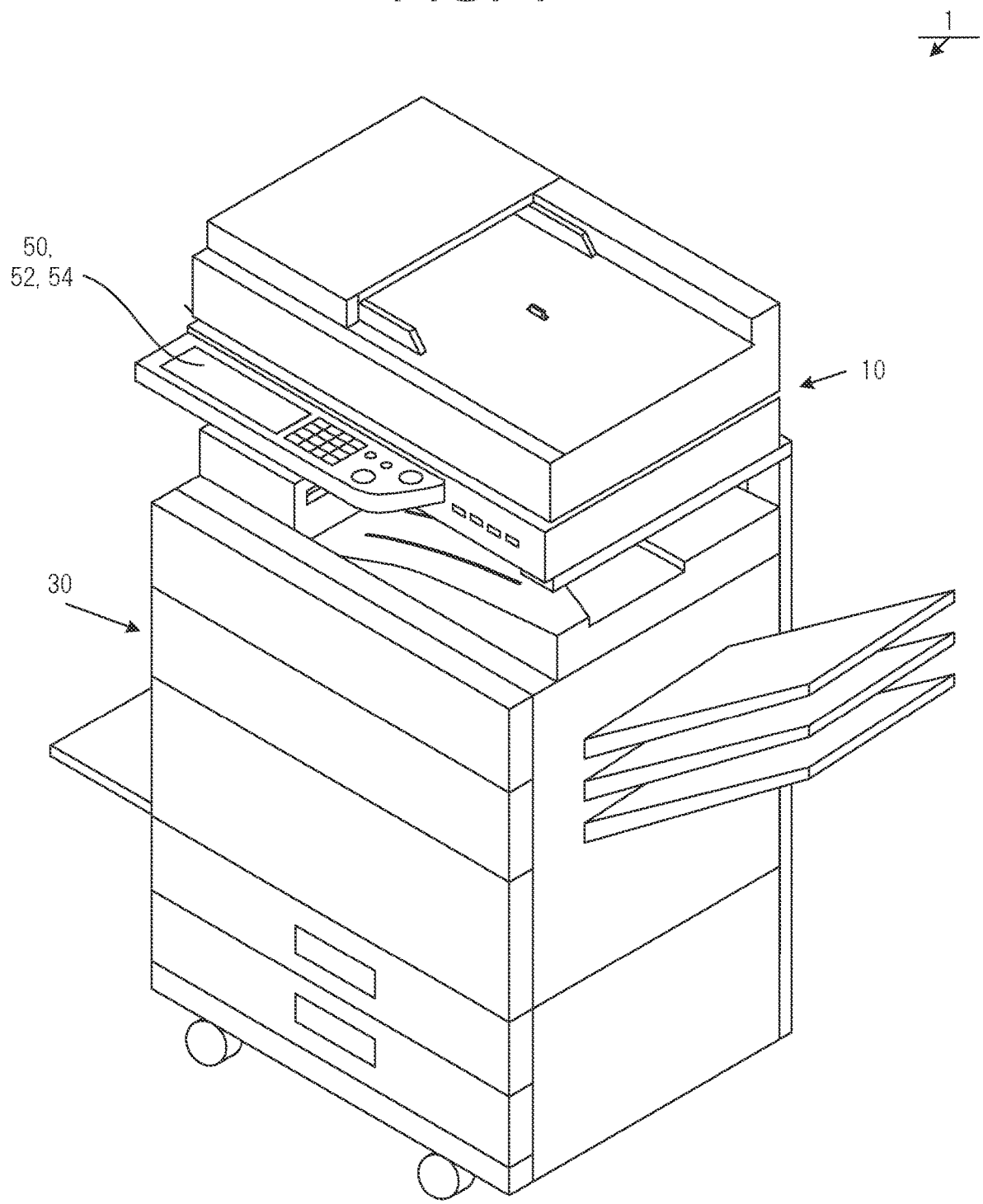
FIG. 1 is an external perspective view of an image forming apparatus according to a first embodiment.
Figure 2:
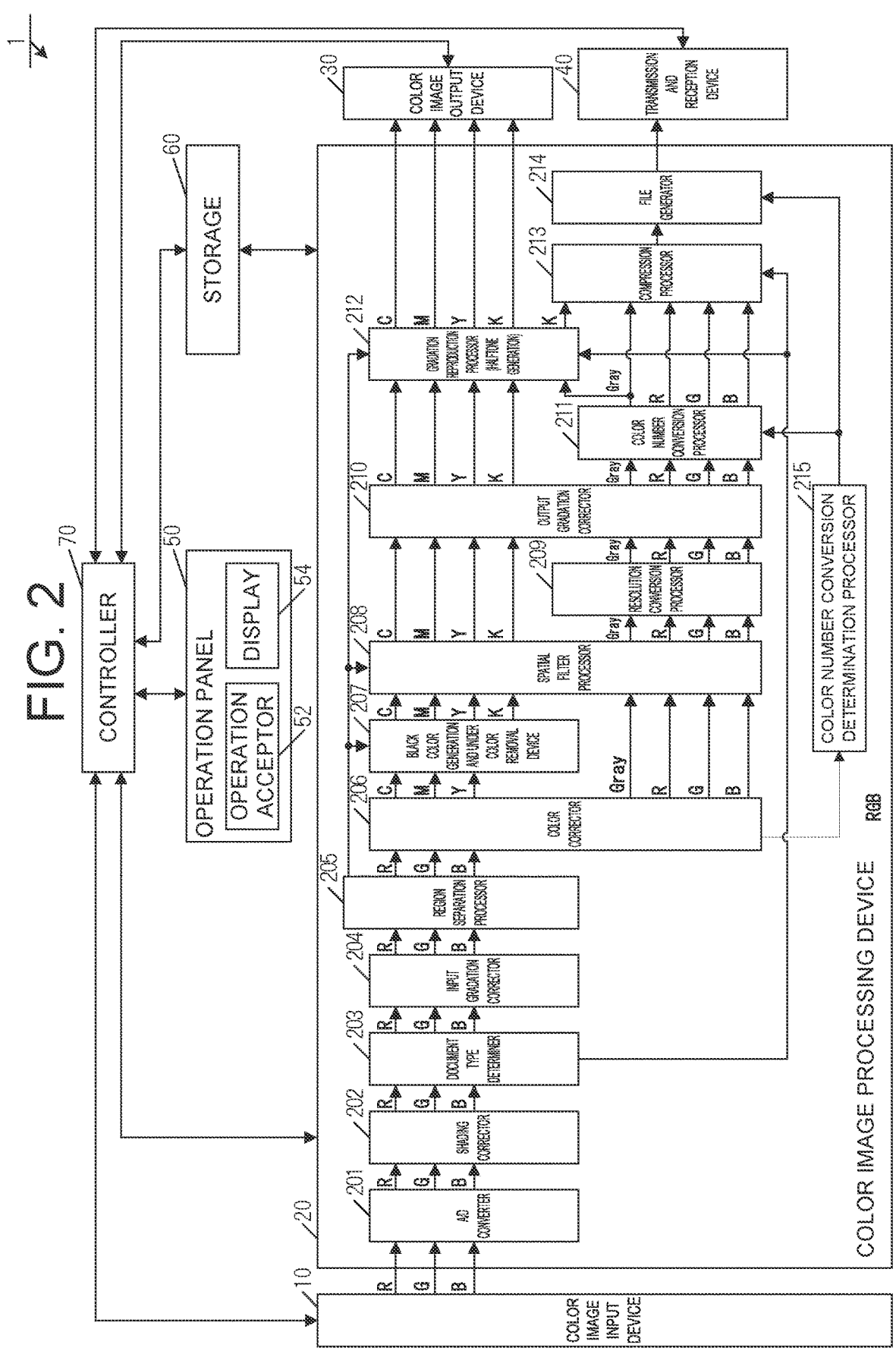
FIG. 2 is a diagram for describing a functional configuration of the image forming apparatus according to the first embodiment.

FIG. 1 is an external perspective view of the image forming apparatus 1, and FIG. 2 is a block diagram illustrating a functional configuration of the image forming apparatus 1. As illustrated in FIG. 2, the image forming apparatus 1 includes a color image input device 10, a color image processing device 20, a color image output device 30, a transmission and reception device 40, an operation panel 50, a storage 60, and a controller 70.

The color image input device 10 is a device that optically reads an image from a document to input the image. The color image input device 10 includes, for example, a color scanner including a CCD (Charge Coupled Device). The color image input device 10 reads a reflected light image from a document as an RGB (R: red, G: green, B: blue) analog signal by using the CCD, to output the image as the RGB analog signal to the color image processing device 20. In the present embodiment, the image input by the color image input device 10 is referred to as an input image.

The color image processing device 20 is a device that executes a predetermined process on the input image to generate color image data consisting of an RGB digital signal (hereinafter referred to as an RGB signal), and a compressed file that is based on the image data. A specific functional configuration of the color image processing device 20 will be described later.

The color image output device 30 is an output device (a printing device) that forms a color image on a recording sheet (such as a recording paper sheet), from an image that is based on the image data generated by the color image processing device 20, by using a method such as thermal transfer, an electrophotographic method, and an inkjet method, and outputs the formed color image. The color image output device 30 functions as an image former in the present disclosure.

The transmission and reception device 40 is a device that communicates with another device. The transmission and reception device 40 includes a device capable of performing communication, such as a network card and a modem. The transmission and reception device 40 is connectable to a communication network such as a public line network, a LAN (Local Area Network), or the Internet. The transmission and reception device 40 transmits the compressed file of the image data generated by the color image processing device 20 to an external device by a communication method such as facsimile or e-mail. For example, when a Scan to e-mail mode is selected on the operation panel 50, the transmission and reception device 40 attaches the compressed file to an e-mail and transmits the e-mail to a set transmission destination.

The operation panel 50 inputs an operation to the image forming apparatus 1 and displays various types of information. An operation acceptor 52 includes an input device such as a setting button and a numeric keypad for inputting an operation mode and various types of settings of the image forming apparatus 1. A display 54 includes a display device such as an LCD (Liquid crystal display), an organic EL (electro-luminescence) display, and a micro LED display. The operation panel 50 may be a touch panel in which the operation acceptor 52 and the display 54 are integrally formed. In this case, a method of detecting an input to the touch panel may be a common detection method such as a resistive method, an infrared method, an electromagnetic induction method, and a capacitive method.

The storage 60 is a functional element that stores various types of data such as image data and various types of programs, and includes, for example, a storage device such as an SSD (Solid State Drive), which is a semiconductor memory, and an HDD (Hard Disk Drive).

The controller 70 is a functional element that controls the entire image forming apparatus 1. The controller 70 realizes various types of functions by reading and executing the various types of programs stored in the storage 60, and includes one or a plurality of arithmetic devices (for example, a CPU (Central Processing Unit).

In the present embodiment, the controller 70 controls the color image input device 10, the color image processing device 20, the color image output device 30, the transmission and reception device 40, the operation panel 50, and the storage 60 to execute various types of processes executed by the image forming apparatus 1.

Next, the color image processing device 20 will be described in detail. An A/D converter 201 converts the RGB analog signal output from the color image input device 10 into an RGB digital signal (RGB signal), to convert the RGB analog signal into image data consisting of the RGB signal (to generate image data). The A/D converter 201 outputs the RGB signal to a shading corrector 202.

The shading corrector 202 performs a process of removing, from the RGB signal output from the A/D converter 201, various types of distortions generated in an illumination system, an image-formation system, and an imaging system of the color image input device 10. The shading corrector 202 outputs the RGB signal from which the distortions are removed, to a document type determiner 203.

The document type determiner 203 converts the RGB signal (RGB reflectance signal) output from the shading corrector 202 into a density signal indicating a density of each RGB color, and executes a document type determination process of determining a type of a document such as characters, a picture, and printing paper. A processing result of the document type determination process (automatic document discrimination result) is reflected in an image process of a subsequent stage. If the document type is set by a user using the operation panel 50, the document type determiner 203 does not execute the document type determination process. The document type determiner 203 outputs the RGB signal output from the shading corrector 202 to an input gradation corrector 204.

The input gradation corrector 204 performs an image quality adjustment process such as a color balance adjustment, a background density removal, and a contrast adjustment on the RGB signal output from the document type determiner 203. The input gradation corrector 204 outputs the RGB signal obtained by the image quality adjustment process, to a region separation processor 205.

The region separation processor 205 classifies each pixel in the image that is based on the RGB signal output from the input gradation corrector 204 into a pixel belonging to a predetermined region (for example, any one of a character region, a halftone dot region, or a picture region), to separate regions of the image. The region separation processor 205 outputs, to a black color generation and under color removal device 207, a spatial filter processor 208, and a gradation reproduction processor 212, a region identification signal indicating a region to which each pixel belongs, based on the separation result. The region separation processor 205 outputs the RGB signal output from the input gradation corrector 204 to a color corrector 206.

The color corrector 206 executes the following process, according to an output destination of the image data.
(1) If Image Data is Output to Color Image Output Device 30

The color corrector 206 converts the RGB signal output from the region separation processor 205 into a CMY digital signal (hereinafter, referred to as a CMY signal). For example, to realize a faithful color reproduction, the color corrector 206 performs a process of removing, from the CMY signal, color turbidity that is based on the spectral characteristics of CMY color materials including an unnecessary absorption component. The color corrector 206 outputs the color-corrected CMY signal to the black color generation and under color removal device 207.
(2) If Compressed File Based on Image Data is Output to Transmission and Reception Device 40

The color corrector 206 converts the RGB signal output from the region separation processor 205 into a color-corrected RGB signal (such as in a case where a full color mode is selected as the color mode on the operation panel) or a gray signal (such as in a case where a monochrome mode is selected as the color mode on the operation panel). The color corrector 206 outputs the color-corrected RGB signal or the gray signal to the spatial filter processor 208. The color corrector 206 further outputs the color-corrected RGB signal to a color number conversion determination processor 215.

The black color generation and under color removal device 207 performs a black color generation process of generating a black color (K) signal from the CMY signal, based on the CMY signal output from the color corrector 206, and a process of subtracting the K signal obtained from the CMY signal in the black color generation process and generating a new CMY signal. As a result, the CMY digital signal having three colors is converted into a CMYK digital signal having four colors (hereinafter, referred to as CMYK signal). The black color generation and under color removal device 207 outputs the CMYK signal obtained by converting the CMY signal, to the spatial filter processor 208.

A typical example of the black color generation process is a method of generating black color by using skeleton black. In the present method, if it is assumed that the input/output characteristic of the skeleton curve is y=f(x), data to be input are C, M, and Y, data to be output are C', M', Y', and K', and a UCR (Under Color Removal) rate is α (0<α<1), then the black color generation and under color removal process is represented by the following equations (1) to (4).

$$K'=f(\min(C,M,Y)) \tag{1}$$

$$C'=C-\alpha K' \tag{2}$$

$$M'=M-\alpha K' \tag{3}$$

$$Y'=Y-\alpha K' \tag{4}$$

Here, the UCR rate α (0<α<1) indicates how much the CMY is reduced by replacing, with K, a portion where the CMY overlaps. Equation (1) indicates that the K signal is generated according to the smallest signal strength among strengths of the C signal, the M signal, and the Y signal.

The spatial filter processor 208 executes the following process, according to the output destination of the image data.
(1) If Image Data is Output to Color Image Output Device 30

The spatial filter processor 208 performs a spatial filter process by a digital filter on the image data of the CMYK signal output from the black color generation and under color removal device 207, based on the region identification signal input from the region separation processor 205. For example, the spatial filter processor 208 executes a process of correcting spatial frequency characteristics in the image data of the CMYK signal, to improve blurring or grainy degradation of the image. For example, the spatial filter processor 208 performs a spatial filter process on a region separated as the character region by the region separation processor 205, using a filter with a large enhancement amount of a high-frequency component, to improve the reproducibility of the characters. The spatial filter processor 208 performs a low-pass filter process of removing an input halftone dot component from a region separated as a halftone dot region by the region separation processor 205. The spatial filter processor 208 outputs the processed CMYK signal to an output gradation corrector 210.

(2) If Compressed File Based on Image Data is Output to Transmission and Reception Device 40

The spatial filter processor 208 performs a spatial filter process by a digital filter on the signal (the RGB signal or the gray signal) output from the color corrector 206, based on the region identification signal input from the region separation processor 205. For example, the spatial filter processor 208 executes a process of correcting spatial frequency characteristics to improve blurring or grainy degradation of the image. The spatial filter processor 208 outputs the processed signal to a resolution conversion processor 209.

The resolution conversion processor 209 performs a resolution conversion process on the signal (the RGB signal or the gray signal) output from the spatial filter processor 208, to obtain image data having a resolution set on the operation panel 50. For example, if the image data of a scanner has an input resolution of 600 DPI×300 DPI and the resolution selected on the operation panel 50 is 300 DPI×300 DPI, the resolution conversion processor 209 determines the average value for every two pixels in a main scanning direction and sets the determined value as an output value, to convert the resolution from 600 DPI×300 DPI to 300 DPI×300 DPI. The resolution conversion processor 209 outputs the processed signal to the output gradation corrector 210.

The output gradation corrector 210 executes the following process, according to the output destination of the image data.

(1) If Image Data is Output to Color Image Output Device 30

The output gradation corrector 210 performs an output gradation correction process on the CMYK signal output from the spatial filter processor 208, based on the halftone dot area ratio being a characteristic of the color image output device 30, and outputs the processed CMYK signal to the gradation reproduction processor 212.

(2) If Compressed File Based on Image Data is Output to Transmission and Reception Device 40

The output gradation corrector 210 performs output gradation correction on the signal (the RGB signal or the gray signal) output from the resolution conversion processor 209 as necessary so that fog or a highlighted background disappears or is thinned. The output gradation corrector 210 outputs the processed RGB signal to a color number conversion processor 211.

If an output (a signal indicating ON or OFF of a color number conversion process) from the color number conversion determination processor 215, which will be described later, is input to the color number conversion processor 211, and the signal indicating ON of the color number conversion process is input to the color number conversion processor 211, the color number conversion process is performed. The color number conversion process is a process of performing a color reduction process on image data consisting of the RGB signal output from the color corrector 206 to generate image data. If the color number conversion processor 211 generates the image data subjected to the color reduction process (image data of a color-reduced image), the RGB signal of the image data subjected to the color reduction process is output to a compression processor 213. If the signal indicating OFF of the color number conversion process is input to the color number conversion processor 211, the color number conversion processor 211 does not execute the color number conversion process, and outputs the RGB signal output from the color corrector 206 to the compression processor 213 (for example, in full color). The specific functional configuration of the color number conversion processor 211 and the process executed by the color number conversion processor 211 will be described later.

If the color reduction process is not performed, the color number conversion processor 211 outputs the RGB signal output from the output gradation corrector 210 to the compression processor 213. Alternatively, if the color reduction process is not performed, the color number conversion processor 211 outputs, to the gradation reproduction processor 212 and the compression processor 213, the gray signal output from the output gradation corrector 210.

The gradation reproduction processor 212 executes the following process, according to the output destination of the image data.

(1) If Image Data is Output to Color Image Output Device 30

The gradation reproduction processor 212 performs a halftone process on the CMYK signal output from the output gradation corrector 210 in accordance with the region, based on the region identification signal output from the region separation processor 205. For example, the gradation reproduction processor 212 performs a binarization or multi-value conversion process on the character region by using a high-resolution screen suitable for reproducing high-frequency components. The gradation reproduction processor 212 performs a binarization or multilevel conversion process on the halftone dot region by using a screen emphasizing gradation reproduction. The gradation reproduction processor 212 outputs the processed CMYK signal to the color image output device 30.

(2) If Compressed File Based on Image Data is Output to Transmission and Reception Device 40

If monochrome binary is selected as the color mode of the image data to be output on the operation panel 50, the gradation reproduction processor 212 performs a binarization process on the gray signal output from the color number conversion processor 211. The gradation reproduction processor 212 outputs the processed signal (a K signal consisting of a monochrome binary signal) to the compression processor 213. On the other hand, if monochrome binary is not selected as the color mode of the image data to be output, the gradation reproduction processor 212 outputs, to the compression processor 213, the RGB signal output from the color number conversion processor 211.

The compression processor 213 performs a compression process, if necessary, on the image data including the RGB signal, the gray signal, and the monochrome binary signal, in the JPEG (Joint Photographic Experts Group) format or in the MMR (Modified Modified Read) format according to a file format setting of the operation panel 50, to generate compressed data. The compressed data may be image data or PDF (Portable Document Format) format data. When the compression processor 213 generates normal PDF data that is not subjected to the color reduction process, the compression processor 213 may control the compression rate of the JPEG image data included in the PDF data, based on a determination result of the type of the document by the document type determiner 203. The compression processor 213 outputs the compressed data to a file generator 214.

The file generator 214 generates a file, based on the compressed data output from the compression processor 213, and outputs the file to the transmission and reception device 40. The file generator 214 may use, as input, a signal output from the color number conversion determination processor 215, which will be described later, to generate a file, based on the signal. For example, if the signal indicating ON of the color number conversion process is input to the file generator 214, the file generator 214 may generate a file in an index color PDF format. If the signal indicating OFF of the color number conversion process is input to the file generator 214, the file generator 214 may generate a file in a JPEG-PDF format.

The color image processing device 20 may temporarily store image data (intermediate data) during processing in the storage 60 when the above-mentioned processing is executed. The color image processing device 20 may store the compressed file generated by the file generator 214 in the storage 60 before outputting the compressed file to the transmission and reception device 40.

The color number conversion determination processor 215 uses the RGB signal output from the color corrector 206 as input, to determine whether to perform color number conversion. If the color number conversion is performed, the color number conversion determination processor 215 outputs the signal indicating "ON" of the color number conversion process. On the other hand, if the color number conversion is not performed, the color number conversion determination processor 215 outputs the signal indicating "OFF" of the color number conversion process (signal indicating that the color number conversion is not performed).

The color number conversion determination processor 215 determines, for example, whether a document needs to be subjected to color number conversion, according to the color mode of the image data to be output.

For example, if the color mode is "color", the color number conversion determination processor 215 determines that the color number conversion is performed only if all of the following three conditions are satisfied.

A white background is present in a certain ratio or more with respect to the document size (white background determination)

A picture region is present in less than a certain ratio with respect to the document size (picture determination)

A color distribution when the region is divided into color regions is within a constant range (color distribution determination)

In the color distribution determination, the color number conversion determination processor 215 may employ a result of a median cut method in the color reduction process described later. In this case, the color number conversion processor 211 executes an initial classification process and a region division process described later, regardless of whether the color reduction process is performed. At this time, the color number conversion determination processor 215 determines whether the color distribution is within a constant range, based on the total size of regions obtained from division by the color number conversion processor 211 and a position of each region.

For example, if the color mode is "monochrome", the color number conversion determination processor 215 determines whether to perform color number conversion, based on the following conditions.

A character region is blacked out in a simple binarization (character collapse determination)

A picture region is blacked out in a simple binarization (picture collapse determination)

A picture region is present in less than a certain ratio with respect to the document size (picture determination)

A pseudo-contour that makes it difficult to read characters is not generated in the character region (pseudo-contour determination)

In this case, the color number conversion determination processor 215 determines to perform the color number conversion process, if characters or a picture collapse, the picture region is less than a certain ratio, and a pseudo-contour is not generated.

The ratio and the range used in the determination may be determined in advance, or may be set by the user. The color number conversion determination processor 215 may perform the above-mentioned determination, according to an output setting of the image data to be output. For example, if a PDF file is to be output, the color number conversion determination processor 215 may perform the determination described above (automatic setting mode), when the color number conversion determination processor 215 automatically determines whether to use full color or a reduced color for each page, and automatically determines whether to use grayscale, color-reduced gray, or black-white binarization for each page. In this case, when the mode is not the automatic setting mode (when the user manually selects whether the color number conversion process is to be performed), the color number conversion determination processor 215 may output a signal based on the selection by the user, without performing the determination described above.

1.2 Details of Color Number Conversion Processor 1.2.1 Process Outline

In the present embodiment, the color number conversion processor 211 divides, in the input color image (input image), an internal region of a color space used in the color reduction process into regions of achromatic color/chromatic color, and further distributes (classifies) each pixel of the input image to each region of a plurality of regions obtained by dividing the region of chromatic color according to a condition. The color number conversion processor 211 determines a representative color for each achromatic color/chromatic color by the median cut method, and then, assigns an index value of a representative color closest to each pixel of the input image, to generate a color-reduced image in which the colors of the input image are reduced.

In the present embodiment, the number of colors included in the color-reduced image (the number of representative colors determined by the median cut method) is referred to as a color reduction number. In the color reduction number, each of the number of representative achromatic colors (a first predetermined number) and the number of representative chromatic colors (a second predetermined number) may be determined, such as in an example of "achromatic colors=5, chromatic colors=15", or the total sum of the number of representative achromatic colors and the number of representative chromatic colors may be determined, such as in an example of "20".

The color reduction number may be determined according to a manual document mode (a document type set by a user) or according to an automatic document discrimination result being a determination result of the document type determiner 203, or may be set by the user, or may be determined in advance.

If the color reduction number is determined according to the type of the document and the color mode of the image data to be output, a combination of the type of the document and the color mode of the image data to be output is associated with the color reduction number and stored in the storage 60 in advance. In this case, it is only required that the color number conversion processor 211 acquires the color reduction number corresponding to the manual document mode or the automatic document discrimination result from the storage 60.

1.2.2 Configuration of Color Number Conversion Processor

A configuration of the color number conversion processor 211 in the present embodiment will be described with reference to FIGS. 3A and 3B. The color number conversion processor 211 includes the functional elements illustrated in any one of FIG. 3A and FIG. 3B, depending on the color space used in the color reduction process.

(1) If RGB Color Space is Used

Figure 3A:
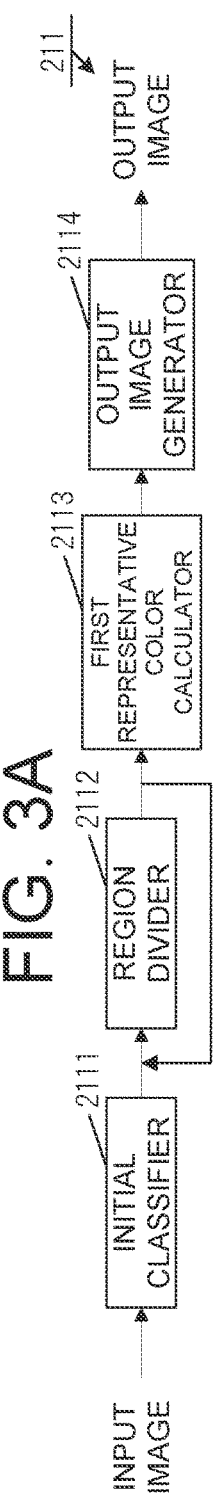
FIGS. 3A and 3B are diagrams for describing a functional configuration of a color number conversion processor in the first embodiment.

As illustrated in FIG. 3A, the color number conversion processor 211 includes an initial classifier 2111, a region divider 2112, a first representative color calculator 2113, and an output image generator 2114.

(2) If Color Space Other than RGB Color Space is Used

Figure 3B:
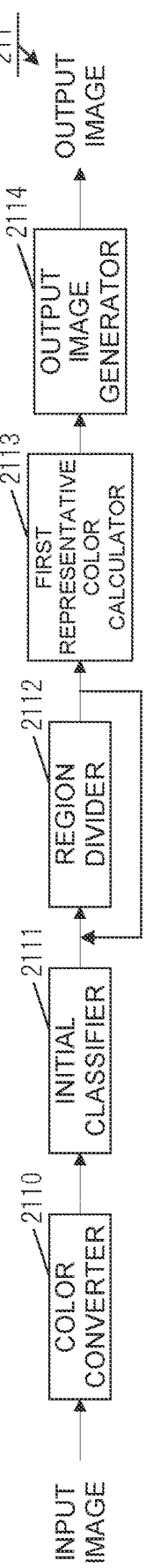

As illustrated in FIG. 3B, the color number conversion processor 211 includes a color converter 2110, the initial classifier 2111, the region divider 2112, the first representative color calculator 2113, and the output image generator 2114.

The color converter 2110 performs a color conversion process of converting pixel values of pixels included in an input image (RGB signal) into pixel values in a predetermined color space (for example, a YUV (YCbCr) color space, an L* a* b* (CIELAB) color space, an LCH color space, and the like).

The initial classifier 2111 executes an initial classification process of classifying each pixel of the input image into regions obtained by dividing the color space used in the color reduction process. The region divider 2112 executes a region division process of dividing the region divided in the initial classification process, based on the median cut method. The first representative color calculator 2113 executes a first representative color calculation process of calculating a representative color from the region divided by the region division process. The output image generator 2114 executes an output image generation process of generating a color-reduced image using the representative color calculated by the first representative color calculation process. The initial classification process, the region division process, the first representative color calculation process, and the output image generation process will be described later.

If the color space used in the color reduction process is a color space other than the RGB color space, the color number conversion processor 211 uses the color converter 2110 to convert the color space of the RGB signal (the input image) output from the output gradation corrector 210, and outputs a result of the conversion to the initial classifier 2111. If the color space used in the color reduction process is an RGB color space, the color number conversion processor 211 outputs the RGB signal (the input image) output from the output gradation corrector 210 to the initial classifier 2111. The color number conversion processor 211 executes the initial classification process, the region division process, the first representative color calculation process, and the output image generation process, to generate a color-reduced image of the input image.

It is only required that the color number conversion processor 211 applies one color space of the above-mentioned color spaces as the color space used in the color reduction process, and is provided with a functional element corresponding to the color reduction process in the one color space. For example, the color space used in the color reduction process may be determined at the time of manufacturing the image forming apparatus 1, based on design principles of the image forming apparatus 1 and the like.

For example, if the color reduction process is performed efficiently with emphasis on speed, an RGB color space for which color conversion is not performed may be used as the color space used in the color reduction process. If color reproduction is emphasized, an L* a* b* color space in which the brightness and the chromaticity are separated and divided regions of color regions are determined by hues in the initial classification process described later may be used as the color space used in the color reduction process. When considering the balance between speed and color reproduction, a YUV (YCbCr) color space for which the calculation amount of the color conversion is not high and that can be separated into brightness and chromaticity may be used as the color space used in the color reduction process.

The color number conversion processor 211 may design the color space used in the color reduction process switchable in three stages, such as in emphasis on speed (RGB color space)—standard (YUV (YCbCr) color space)—emphasis on color reproduction (LAB color space) corresponding to the above-described three color spaces, based on an operation by the user, a state of the image forming apparatus 1 (for example, the number of jobs to be executed), and the like.

Some or all of the color converter 2110, the initial classifier 2111, the region divider 2112, the first representative color calculator 2113, and the output image generator 2114 may be implemented by a program executed by the controller 70, or may be implemented by hardware such as a circuit.

1.2.3 Initial Classification Process

The initial classification process executed by the initial classifier 2111 will be described. The initial classifier 2111 divides the color space used in the color reduction process into regions of achromatic color/chromatic color in advance, and further divides the region of chromatic color into a plurality of regions. Here, the region of achromatic color in the color space is referred to as an achromatic color region, and the region of chromatic color is referred to as a chromatic color region.

When the initial classifier 2111 performs the color reduction process, to control the color reproduction of the color-reduced image according to the type of the document (document type), the initial classifier 2111 first divides the color space used in the color reduction process into one achromatic color region and eight chromatic color regions, by a division method corresponding to the manual document mode or the automatic document discrimination result. The flow of the initial classification process will be described below for each type of color space used in the color reduction process.

1.2.3.1 RGB Color Space

First, the flow of the initial classification process when the color space used in the color reduction process is the RGB color space will be described with reference to FIG. 5. In the present embodiment, it is assumed that each of the R value, the G value, and the B value in the RGB color space takes a value from 0 to 255.

When the RGB color space is represented by a cube (RGB cube), the initial classifier 2111 sets a straight line connecting a vertex (vertex K) of the RGB cube at a position (R, G, B)=(0, 0, 0) of and a vertex (vertex W) at a position (R, G, B)=(255, 255, 255). Here, the initial classifier 2111 chooses an achromatic color (achromatic color region) for a region within a constant range from the straight line connecting the vertex K and the vertex W. On the other hand, the initial classifier 2111 chooses a chromatic color (chromatic color region) for a region outside the constant range from the straight line connecting the vertex K and the vertex W.

If a region is within the constant range from the straight line connecting the vertex K and the vertex W, the absolute value of the difference between the R value and the G value, the absolute value of the difference between the G value and the B value, and the absolute value of the difference between the B value and the R value in pixel values of a target pixel are all within a constant value (threshold value). The threshold value may be set by the user, may be set according to the manual document mode or the automatic document discrimination result, or may be set in advance.

That is, the initial classifier 2111 classifies, in addition to pixels in which the R value, the G value, and the B value are all the same value, pixels in which the R value, the G value, and the B value are substantially the same (pixels close to achromatic color) into an achromatic color region as being pixels of achromatic color.

The initial classifier 2111 divides the chromatic color region into eight rectangular parallelepiped regions, based on each of the eight vertices of the RGB cube (step S100). In the present embodiment, each region (partial region in the color space) into which the color space is divided is referred to as a divided region. Here, the eight rectangular parallelepipeds (divided regions of chromatic color) do not include an achromatic color region.

The divided regions of chromatic color are regions that do not include an achromatic color region, and include the following regions.

(1) Region where the R value, the G value, and the B all take a value from 0 to 127
(2) Region where the R value is from 128 to 255 and the G value and the B value are from 0 to 127
(3) Region where the G value is from 128 to 255 and the R value and the B value are from 0 to 127
(4) Region where the B value is from 128 to 255 and the R value and the G value are from 0 to 127
(5) Region where the R value and the G value are from 128 to 255 and the B value is from 0 to 127
(6) Region where the R value and the B value are from 128 to 255 and the G value is from 0 to 127
(7) Region where the G value and the B value are from 128 to 255 and the R value is from 0 to 127
(8) Region where the R value, the G value, and the B value all take a value from 128 to 255

Figure 4:
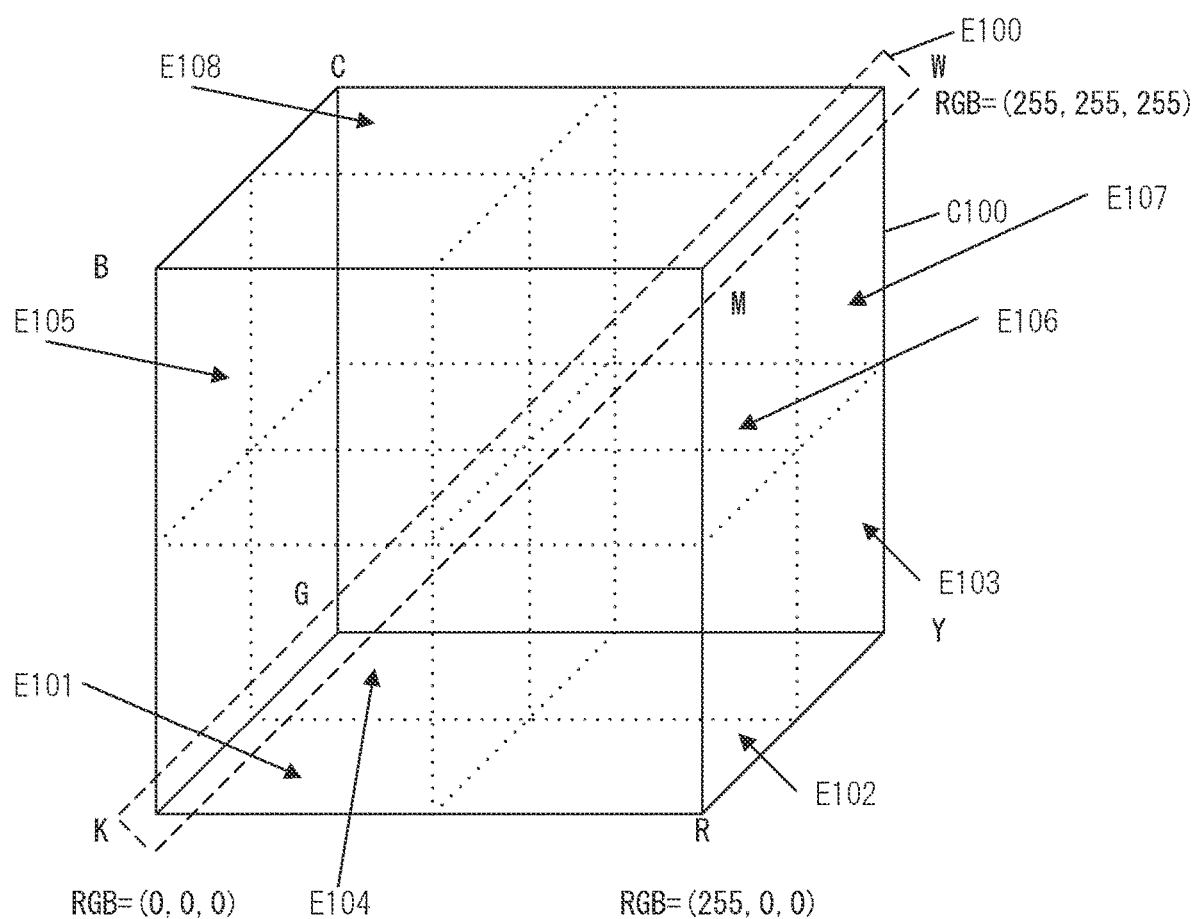
FIG. 4 is a diagram for describing an example of divided regions in an RGB color space of an initial classifier in the first embodiment.

The achromatic color region and the chromatic color regions corresponding to the above description are illustrated in FIG. 4. C100 in FIG. 4 is an RGB cube. The RGB cube includes the following vertices.

Vertex K: (R, G, B)=(0, 0, 0)
Vertex R: (R, G, B)=(255, 0, 0)
Vertex Y: (R, G, B)=(255, 255, 0)
Vertex G: (R, G, B)=(0, 255, 0)
Vertex B: (R, G, B)=(0, 0, 255)
Vertex M: (R, G, B)=(255, 0, 255)
Vertex W: (R, G, B)=(255, 255, 255)
Vertex C: (R, G, B)=(255, 0, 0)

E100 in FIG. 4 is an achromatic color region. The achromatic color region is a region within a constant range from the straight line connecting the vertex K and the vertex W.

The chromatic color regions in C100 include the following eight divided regions into which the chromatic color region is divided, based on each vertex of the RGB cube.

Region E101: region including dark-colored pixels (R, G, B≤127)
Region E102: region including red-based pixels (R>127, G, B≤127)
Region E103: region including yellow-based pixels (R, G>127, B≤127)
Region E104: region including green-based pixels (G>127, R, B≤127)
Region E105: region including blue-based pixels (B>127, R, G≤127)
Region E106: region including magenta-based pixels (R, B>127, G≤127)
Region E107: region including brightly colored pixels (R, G, B>127)
Region E108: region including cyanide-based pixels (G, B>127, R≤127)

The above-mentioned regions are examples of the divided regions. The initial classifier 2111 allows overlap between the divided regions of chromatic color. A chromatic color division method (a range of the divided regions) may be determined according to the manual document mode or the automatic document discrimination result, may be set by the user, or may be determined in advance.

Subsequently, the initial classifier 2111 selects one pixel (a target pixel) from the pixels included in the input image (RGB image data), and acquires the R value, the G value, and the B value, which are the pixel values of the target pixel. The initial classifier 2111 determines whether $|R-G|$ being the absolute value of the difference between the R value and the G value, $|G-B|$ being the absolute value of the difference between the G value and the B value, and $|B-R|$ being the absolute value of the difference between the B value and the R value, are all equal to or less than a threshold value TH1 (step S101). The threshold value TH1 may be set in advance in the image forming apparatus 1, may be settable by the user, or may be set according to the document type.

If $|R-G|$, $|G-B|$, and $|B-R|$ are all equal to or less than the threshold value TH1, the initial classifier 2111 assumes that the target pixel is a pixel of achromatic color and classifies the target pixel into an achromatic color region (step S101; Yes→step S102). On the other hand, if any one of $|R-G|$, $|G-B|$, and $|B-R|$ exceeds the threshold value TH1, the initial classifier 2111 determines, based on the pixel values, whether the target pixel belongs to any one divided region of chromatic color, and classifies the target pixel into the determined divided region (step S101; No→step S104). That is, the initial classifier 2111 assumes that the target pixel is a pixel of chromatic color.

Subsequently, the initial classifier 2111 executes the process in step S102 or the process in step S104, and then, the initial classifier 2111 determines whether all the pixels included in the input image are classified into the region of achromatic color or any one of the divided regions of chromatic color (step S106). If all the pixels are classified, the initial classifier 2111 ends the processing illustrated in FIG. 5 (step S106; Yes). On the other hand, if not all of the pixels are classified, the initial classifier 2111 returns the processing to step S101 (step S106; No→step S101).

1.2.3.2 L* a* b* Color Space

The initial classification process in a case where the color space used in the color reduction process is the L* a* b* color space will be described. When the L* a* b* color space is represented by a cube, the initial classifier 2111 defines a region within a constant range from the L* axis of the cube as a region of achromatic color (achromatic color region) and defines a region outside the constant range from the L* axis as a region of chromatic color (chromatic color region). It is assumed that the L* axis is an axis that perpendicularly intersects a color difference (a* b*) plane and passes through the center of the color difference plane in the cube of the L* a* b* color space. The initial classifier 2111 divides the color difference (a* b*) plane into nine areas (one area of achromatic color and eight areas of chromatic color).

For example, the initial classifier 2111 divides the chromatic color region into eight regions (not including the achromatic color region) formed in a radial shape from the center (the position through which the L* axis passes) in the color difference (a* b*) plane for each L* value, to obtain regions (areas). The eight radially divided regions are the following regions, for example.

(1) Region where $0° \leq \theta < 45°$
(2) Region where $45° \leq \theta < 90°$
(3) Region where $90° \leq \theta < 135°$
(4) Region where $135° \leq \theta < 180°$
(5) Region where $180° \leq \theta < 225°$
(6) Region where $225° \leq \theta < 270°$
(7) Region where $270° \leq \theta < 315°$
(8) Region where $315° \leq \theta < 360°$ Here, the angle $\theta$ is an angle formed with the a* axis at a*>0 (having a positive counterclockwise direction).

Figure 6A:
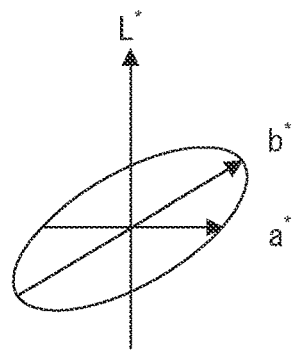
FIGS. 6A and 6B are diagrams for describing an example of divided regions in a CIELAB color space of an initial classifier in the first embodiment.
Figure 6B:
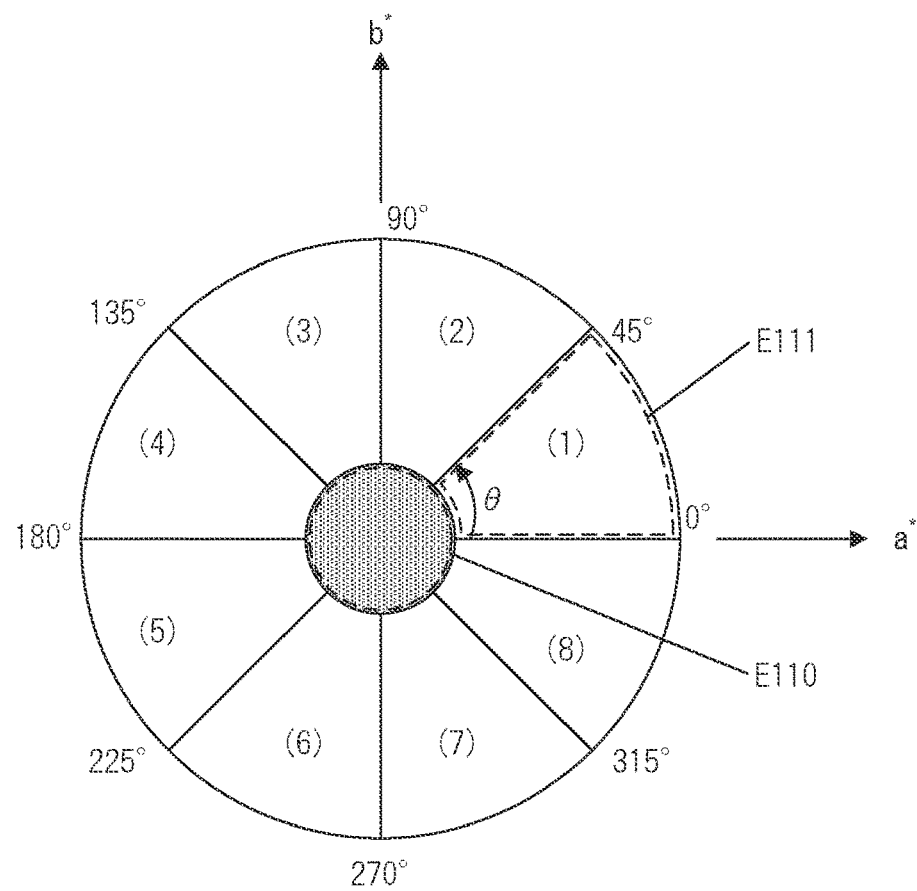

The achromatic color region and the chromatic color regions corresponding to the above description are illustrated in FIGS. 6A and 6B. FIG. 6A is a diagram illustrating a relationship between axes in the L* a* b* color space. As illustrated in FIG. 6A, the L* axis, the a* axis, and the b* axis are orthogonal to each other. Therefore, a plane perpendicular to the L* axis is an a* b* plane (color difference plane).

FIG. 6B is a diagram illustrating the a* b* plane when L* is a predetermined value. Here, a region E110 within a constant range from the L* axis is an achromatic color region. On the other hand, regions (1) to (8) in FIG. 6B are divided regions of chromatic color. The divided regions of chromatic color are obtained by radially dividing a region of chromatic color into eight regions from the center (position through which the L* axis passes) in the color difference plane (a* b* plane), and are regions other than the achromatic color region. A region E111 in FIG. 6B is one divided region of the divided regions of chromatic color.

Figure 7:
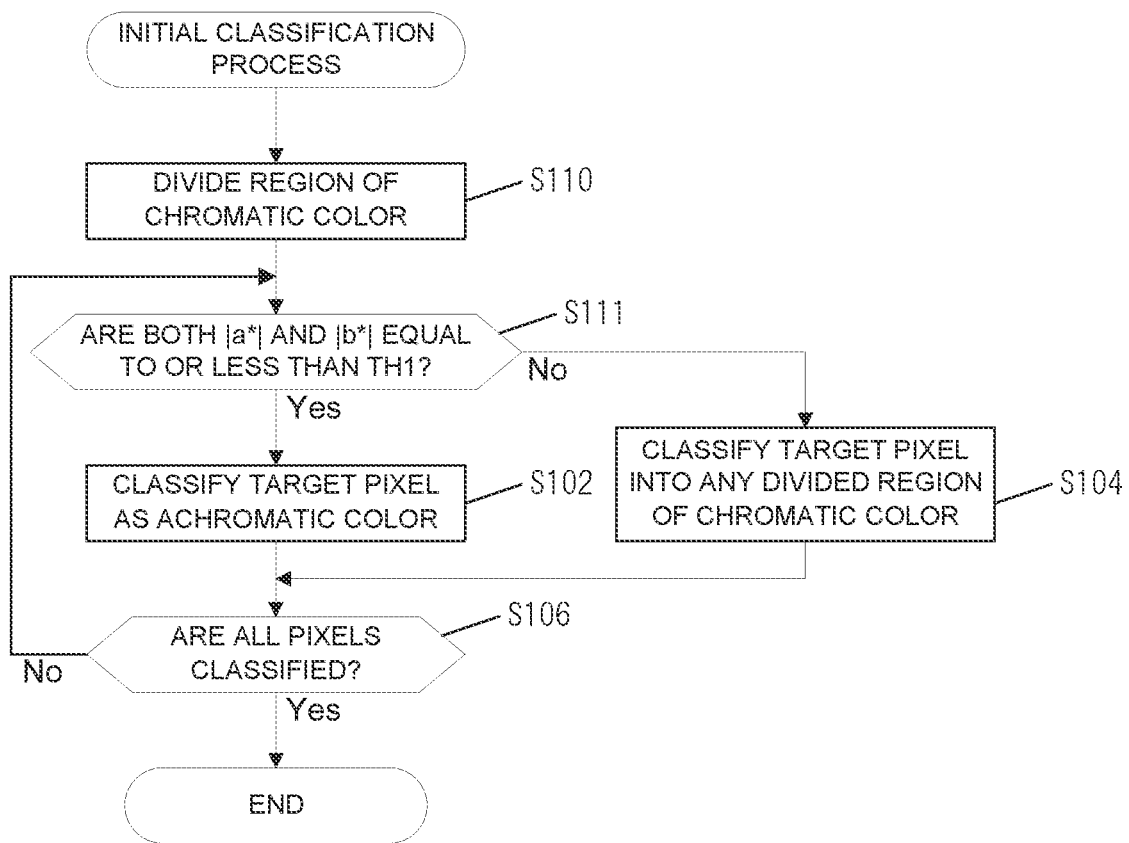
FIG. 7 is a flowchart for describing a flow of an initial classification process (in the case of the CIELAB color space) in the first embodiment.

Next, the flow of the initial classification process executed by the initial classifier 2111 will be described with reference to FIG. 7. FIG. 7 is a diagram in which step S100 in FIG. 5 is replaced by a process (step S110) of dividing the region of chromatic color as described above, and step S101 in FIG. 5 is replaced by step S111 described below. In step S111 of FIG. 7, the initial classifier 2111 selects one pixel (a target pixel) from the pixels included in the input image, and acquires the a* value and the b* value from the pixel values of the target pixel. The initial classifier 2111 determines whether the target pixel is achromatic, based on the a* value and the b* value. For example, the initial classifier 2111 determines whether $|a^*|$ being the absolute value of the a* value, and $|b^*|$ being the absolute value of the b* value, are both equal to or less than the predetermined threshold value TH1 (step S111).

If $|a^*|$ and $|b^*|$ are both equal to or less than the threshold value TH1, the initial classifier 2111 classifies the target pixel into an achromatic color (step S111; Yes→step S102). On the other hand, if any one of $|a^*|$ and $|b^*|$ of the pixel values of the target pixel exceeds the threshold value TH1, the initial classifier 2111 determines, based on the pixel values, whether the pixel belongs to any one of the divided regions of chromatic color, and classifies the pixel into the determined divided region (step S111; No→step S104).

In step S110, when a value of $(a^*)^2+(b^*)^2$ (or a value of the square root of the value) is equal to or less than the threshold value TH1, the initial classifier 2111 may determine that the target pixel is achromatic.

The initial classifier 2111 executes the process in step S102 or the process in step S104, and then, the initial classifier 2111 determines whether all the pixels included in the input image are classified into the region of achromatic color or any one of the divided regions of chromatic color (step S106). If all the pixels are classified, the initial classifier 2111 ends the processing illustrated in FIG. 7 (step S106; Yes), and if not all of the pixels are classified, the initial classifier 2111 returns the processing to step S111 (step S106; No→step S111).

1.2.3.3 YUV (YCbCr) Color Space

The initial classification process in a case where the color space used in the color reduction process is the YUV (YCbCr) color space will be described. When the YCbCr color space is represented by a cube, the initial classifier 2111 defines a region within a constant range from a Y axis of the cube as a region of achromatic color (achromatic color region) and defines a region outside the range as a region of chromatic color (chromatic color region). It is assumed that the Y axis is an axis that perpendicularly intersects a chromaticity plane (an UV plane or a CbCr plane) in the cube of the YCbCr color space and passes through the center of the chromaticity plane. The initial classifier 2111 divides the chromaticity (UV, CbCr) plane into nine areas (one area of achromatic color and eight areas of chromatic color).

For example, the initial classifier 2111 may divide the chromatic color region into eight regions (not including the achromatic color region) formed in a radial shape from the center (the position through which the Y axis passes) in the chromaticity (UV, CbCr) plane for each Y value, to obtain regions (areas), or may define regions according to the Y value to obtain the regions (areas).

Here, an example in which the chromaticity (UV) plane is divided into regions (areas) defined according to the Y value will be described with reference to FIGS. 8A to 8D. FIGS. 8A to 8D are diagrams illustrating an achromatic color region and divided regions of chromatic color in the case of the YUV (YCbCr) color space. In FIGS. 8A to 8D, (1) to (4) each illustrate the chromaticity (UV) plane.

Figure 8A:
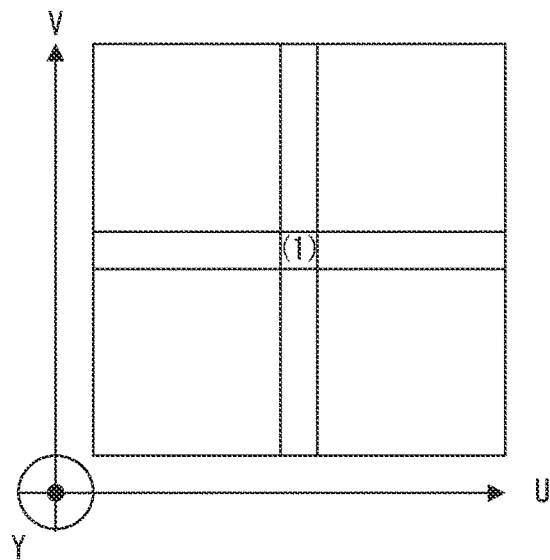
FIGS. 8A to 8D are diagrams for describing examples of divided regions in a YUV (YCbCr) color space of an initial classifier in the first embodiment.

For example, as illustrated by (1) in FIG. 8A, the initial classifier 2111 defines the achromatic color region (area of achromatic color) as a rectangular region in the center of the UV space. In this case, the achromatic color region is a region where the U value and the V value are each within a predetermined value range. The achromatic color region corresponds to a region including pixels in which $|Cb|$ being the absolute value of the Cb value, and $|Cr|$ being the absolute value of the Cr value, are each equal to or less than the predetermined threshold value TH1.

The initial classifier 2111 divides the chromatic color region into eight regions according to the Y value. That is, the initial classifier 2111 determines, for each divided region, the range of the U value and the range of the V value that the pixels included in the range may take as pixel values, according to the Y value. For example, if the range of values the Y value may take is from 0 to 255, the initial classifier 2111 divides the chromatic color area into eight regions (2) to (9) in FIG. 8B, if the Y value is from 0 to 84. Similarly, if the Y value is from 85 to 169, the initial classifier 2111 divides the chromatic color area as illustrated in FIG. 11C, and if the Y value is from 170 to 255, the initial classifier 2111 divides the chromatic color area as illustrated in FIG. 11D.

Figure 8B:
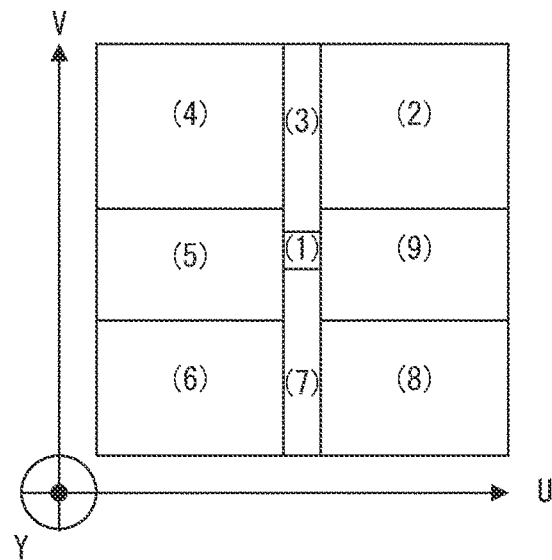
Figure 8C:
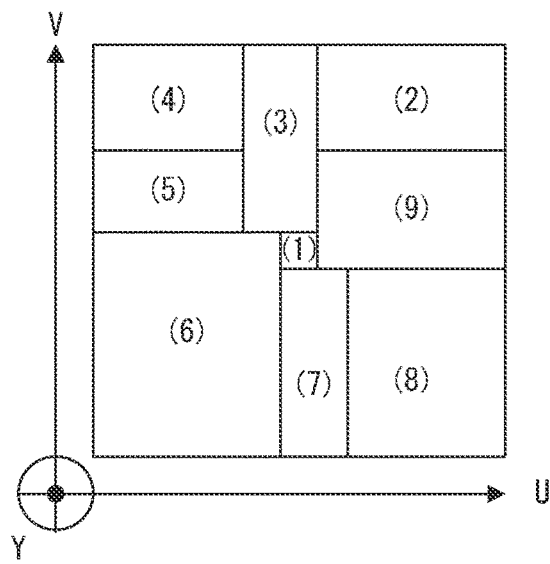
Figure 8D:
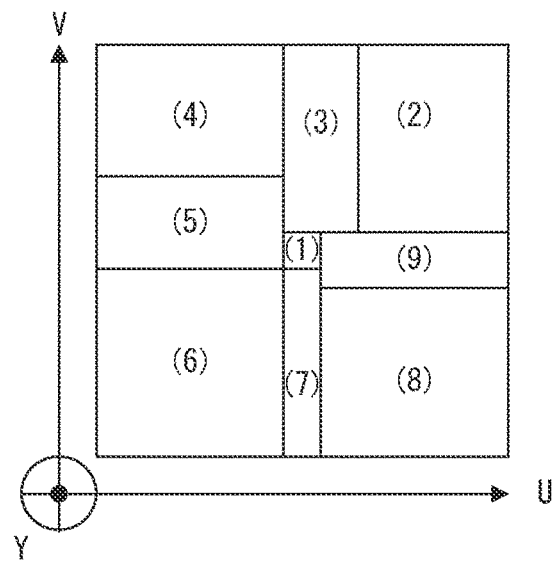

In FIGS. 8B, 8C, and 8D, (1) is a reference sign indicating an area of achromatic color, and (2) to (9) are reference signs indicating areas of chromatic color. FIGS. 8B, 8C, and 8D illustrate that pixels classified into the same reference sign belong to the same achromatic color region or the same divided region of chromatic color. The divided regions of chromatic color illustrated in FIGS. 8B to 8D are examples of a case where colors of the same system are classified in consideration of the difference in color distribution in a UV color plane, according to cases where the Y value is small (dark color), the Y value is large (bright color), and the Y value is in-between the small and large values in the YUV color space. Therefore, the divided regions of the chromatic color region may be regions different from those illustrated in FIGS. 8B to 8D. Division patterns of the chromatic color area may include the three patterns described above or more patterns.

Next, the flow of the initial classification process executed by the initial classifier 2111 will be described. The initial classification process executed by the initial classifier 2111 is similar to the process illustrated in FIG. 7, but in the process illustrated in FIG. 8E, step S110 in FIG. 7 is replaced by the process of dividing the region of chromatic color as described above (step S115), and step S111 in FIG. 7 is replaced by a process in step S116 indicated below.

Figure 8E:
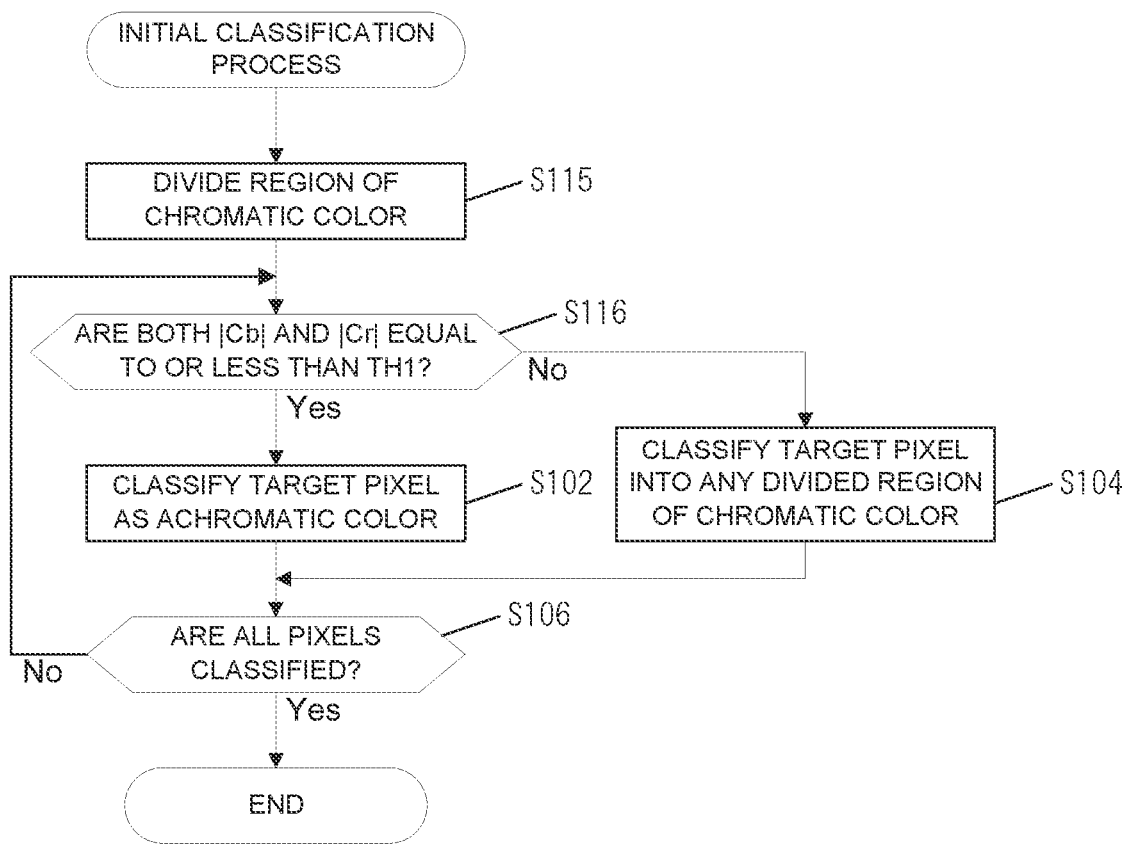
FIG. 8E is a flowchart for describing a flow of an initial classification process (in the case of the YCbCr color space) in the first embodiment.

In step S116 of FIG. 8E, the initial classifier 2111 determines whether |Cb| being the absolute value of the Cb value, and |Cr| being the absolute value of the Cr value, are each equal to or less than the predetermined threshold value TH1. If |Cb| and |Cr| are both equal to or less than the predetermined threshold value TH1, the initial classifier 2111 classifies the target pixel into the region achromatic color (step S116; Yes→step S102), and otherwise, classifies the target pixel into any one of the divided regions of chromatic color (step S116; No→step S104). In the process of step S116, when a value of $Cb^2+Cr^2$ (or $U^2+V^2$) (or a value of the square root of the value) is equal to or less than the threshold value TH1, the initial classifier 2111 may determine that the target pixel is achromatic.

1.2.3.4 LCH Color Space

The initial classification process in a case where the color space used in the color reduction process is the LCH color space will be described. When the LCH color space is represented by a cube, the initial classifier 2111 defines a constant range from an L axis of the cube as a region of achromatic color (achromatic color region) and defines a region outside the range as a region of chromatic color (chromatic color region). It is assumed that the L axis is an axis that perpendicularly intersects a chroma-hue (CH) plane and passes through the center of the chroma/hue plane in the cube of the LCH color space. The initial classifier 2111 divides the chroma-hue (CH) plane into nine areas (one area of achromatic color and eight areas of chromatic color).

For example, the initial classifier 2111 divides the chromatic color region into eight regions (not including the achromatic color region) formed in a radial shape from the center (the position through which the L axis passes) in the chroma-hue (CH) plane for each L value, to obtain regions (areas).

Next, the flow of the initial classification process executed by the initial classifier 2111 will be described. The initial classification process executed by the initial classifier 2111 is similar to the process illustrated in FIG. 7, but in the process illustrated in FIG. 8F, step S110 in FIG. 7 is replaced by the process of dividing the region of chromatic color as described above (step S117), and step S111 in FIG. 7 is replaced by a process in step S118 indicated below.

Figure 8F:
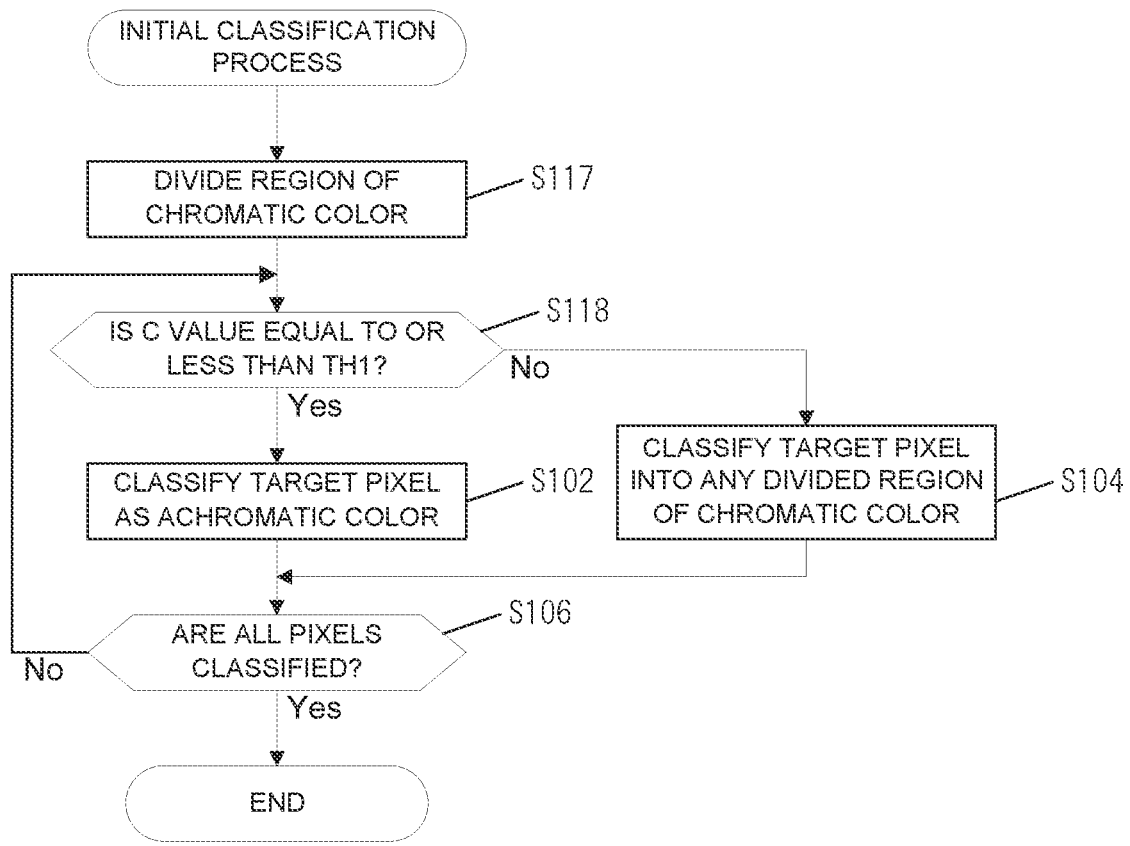
FIG. 8F is a flowchart for describing a flow of an initial classification process (in a case of an LCH color space) in the first embodiment.

In step S118 of FIG. 8F, the initial classifier 2111 determines whether the C value is equal to or less than the threshold value TH1 (step S118). If the C value is equal to or less than the predetermined threshold value TH1, the initial classifier 2111 classifies the target pixel into the region of achromatic color (step S118; Yes→step S102), and otherwise, classifies the target pixel into any one of the divided regions of chromatic color (step S118; No→step S104).

Thus, when the initial classifier 2111 executes the initial classification process, it is possible to assign all pixels included in the input image to the regions including the one achromatic color region and the eight divided regions of chromatic color, even if the color space used in the color reduction process is a color space other than the RGB color space. The initial classifier 2111 outputs the pixels included in the region for each region.

1.2.4 Region Division Process

The flow of the region division process will be described with reference to FIG. 9. The region division process is executed by the region divider 2112. The region division process is a process of dividing regions (one achromatic color region and eight divided regions of chromatic color) into which pixels are classified in the initial classification process. The region division process corresponds to a process of dividing a region in the color reduction process by the median cut method.

First, the region divider 2112 calculates, from the pixel values of the pixels included in a target region, a maximum value and a minimum value on each axis of the color space (step S120), for each region into which the pixels are classified in the initial classification process.

For example, the region divider 2112 selects one region from one achromatic color region and eight divided regions of chromatic color. The region divider 2112 acquires the maximum value and the minimum value for each axis of the color space, based on the pixel values of the pixels included in the selected region. For example, if the color space used in the color reduction process is the RGB color space, the region divider 2112 acquires the R value, the G value, and the B value of all pixels included in the selected region, and calculates the maximum value and the minimum value of the R value, the maximum value and the minimum value of the G value, and the maximum value and the minimum value of the B value.

If the color space used in the color reduction process is the L* a* b* color space, the region divider 2112 calculates the maximum values and the minimum values of the L* value, the a* value, and the b* value, based on the pixels included in each region. Similarly, if the color space used in the color reduction process is the YCbCr color space, the region divider 2112 calculates the maximum values and the minimum values of the Y value, the Cb value, and the Cr value, and if the color space used in the color reduction process is the LCH color space, the region divider 2112 calculates the maximum values and the minimum values of the L value, the C value, and the H value.

Subsequently, the region divider 2112 sets a rectangular parallelepiped having the maximum value and the minimum value for each axis calculated in step S120 as vertices, as the rectangular parallelepiped corresponding to each region into which the pixels are classified (step S122). Regarding the pixel values of the pixels included in a certain region, if the minimum value of L* is 20, the maximum value of L* is 200, the minimum value of a* is 20, the maximum value of a* is 50, the minimum value of b* is 5, and the maximum value of b* is 40, the region divider 2112 sets a rectangular parallelepiped in which the length of the side corresponding to the L* axis is 180, the length of the side corresponding to the a* axis is 30, and the length of the side corresponding to the b* axis is 35. The region divider 2112 may temporarily store information about the set rectangular parallelepiped in the storage 60.

The region divider 2112 may determine, for the achromatic color region, the brightness and lightness of the pixels included in the achromatic color region for each pixel, and set a rectangular parallelepiped including a side consisting of the maximum value and the minimum value of the determined brightness and lightness and two sides having a length of 1. Thus, the region divider 2112 can set a rectangular parallelepiped in which only the brightness and the lightness are considered, as the rectangular parallelepiped corresponding to the achromatic color region.

When the region divider 2112 sets the rectangular parallelepiped, the region divider 2112 may weight the axis according to the visual characteristics of a human being to expand or reduce the lengths of the sides of the rectangular parallelepiped as described below.
  (1) If the color space is the RGB color space, the region divider 2112 may multiply by 1.2 the lengths of the sides of the rectangular parallelepiped corresponding to the R axis and the G axis, and may multiply by 0.8 the length of the side of the rectangular parallelepiped corresponding to the B axis.
  (2) If the color space is the YCbCr color space, the region divider 2112 may multiply by 1.2 the length of the side of the rectangular parallelepiped corresponding to the Cr axis in a rectangular parallelepiped where Cb<0, and may multiply by 0.8 the length of the side of the rectangular parallelepiped corresponding to the Cr axis in a rectangular parallelepiped where Y>0 and Cb>0.
  (3) If the color space is the L* a* b* color space, the region divider 2112 may multiply by 1.2 the length of the side of the rectangular parallelepiped corresponding to the a* axis, and may multiply by 0.8 the lengths of the sides of the rectangular parallelepiped corresponding to the L* axis and the b* axis.

If the ranges of the values that can be taken on each axis are not uniform, the region divider 2112 may expand or reduce the lengths of the sides of the rectangular parallelepiped, or may convert the pixel values into suitable values by performing a predetermined calculation, to obtain uniform ranges for the values that can be taken on each axis.

Subsequently, the region divider 2112 selects, from the rectangular parallelepipeds set in step S122, a rectangular parallelepiped having the longest side, that is, a rectangular parallelepiped having the largest difference between the maximum value and the minimum value calculated in step S120 (step S124). If the color reduction number is determined for each of the number of representative achromatic colors and the number of representative chromatic colors, when any one region among the achromatic color region and the chromatic color region is divided into a number of regions determined by the color reduction number, the region divider 2112 selects one rectangular parallelepiped from the rectangular parallelepipeds corresponding to the other region.

Subsequently, the region divider 2112 divides the rectangular parallelepiped selected in step S124 (hereinafter referred to as the selected rectangular parallelepiped) (step S126). For example, the region divider 2112 executes any one of the following processes as a process of dividing the selected rectangular parallelepiped.
  (1) The region divider 2112 calculates a median value that corresponds to (maximum value−minimum value)/2 with respect to the longest side of the selected rectangular parallelepiped, and divides the selected rectangular parallelepiped at the position of the median value.
  (2) The region divider 2112 determines the axis (for example, the R axis) to which the longest side in the selected rectangular parallelepiped belongs. Subsequently, the region divider 2112 acquires, for each pixel included in the selected rectangular parallelepiped, the pixel value of the axis to which the longest side in the selected rectangular parallelepiped belongs, and generates a histogram (for example, a histogram of the R value). The region divider 2112 accumulates the number of pixel values included in a bin in order, starting from a bin (interval) including the minimum values in the histogram. The region divider 2112 determines a position of the bin including pixels corresponding to ½ of the number of pixels belonging to the selected rectangular parallelepiped, and divides the selected rectangular parallelepiped at the position.

If the process of step S126 is executed, the number of rectangular parallelepipeds set in step S122 increases by 1. Subsequently, the region divider 2112 determines whether the number of rectangular parallelepipeds coincides with the color reduction number (step S128).

Figure 9:
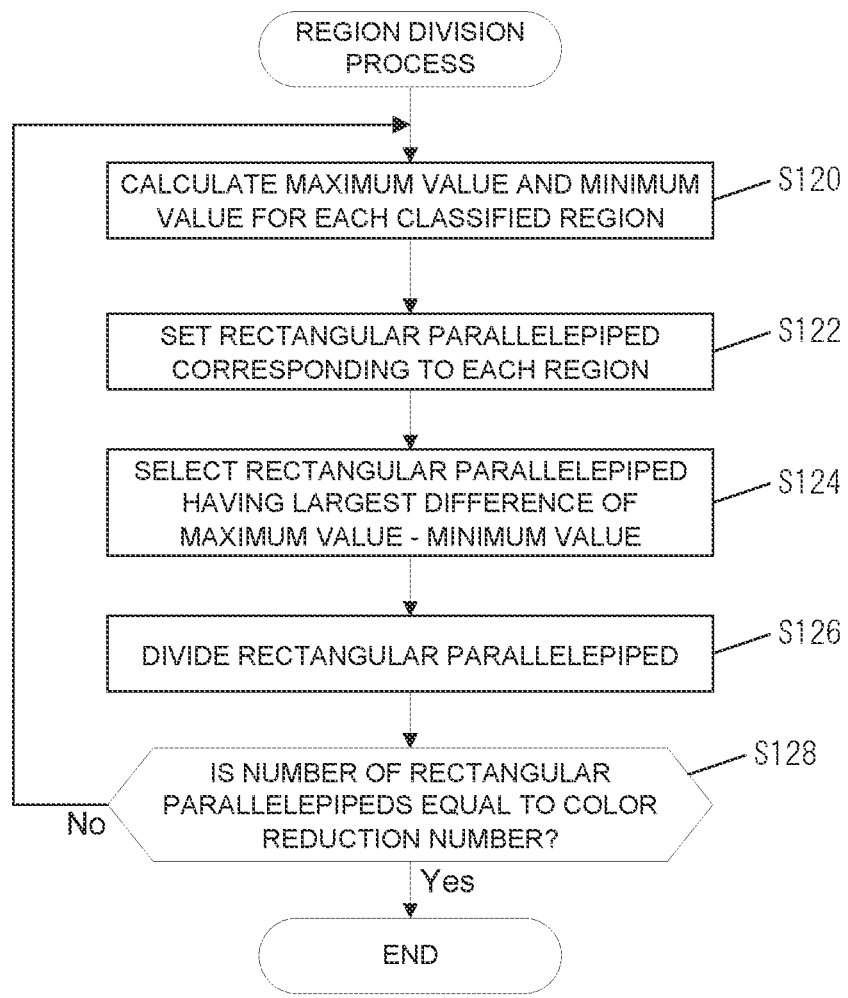
FIG. 9 is a flowchart for describing a flow of a region division process according to the first embodiment.

If the number of regions coincides with the color reduction number, the region divider 2112 ends the process illustrated in FIG. 9 (step S128; Yes). On the other hand, if the number of regions does not coincide with the color reduction number, the region divider 2112 returns the processing to step S120 (step S128; No→step S120).

Thus, the region divider 2112 repeatedly executes the processes from step S120 to step S126 to divide the rectangular parallelepiped until the number of rectangular parallelepipeds coincides with the color reduction number. Therefore, in the color space used in the color reduction process, the achromatic color region is divided into a number (first predetermined number) of regions corresponding to the number of representative achromatic colors. The chromatic color region is divided into a number (second predetermined number) of regions corresponding to the number of representative chromatic colors. The region divider 2112 outputs the divided regions and the pixels included in each region.

1.2.5 First Representative Color Calculation Process

The flow of the first representative color calculation process will be described with reference to FIG. 10. The first representative color calculation process is executed by the first representative color calculator 2113. The first representative color calculation process corresponds to a process of calculating a representative color in the color reduction process by the median cut method.

First, the first representative color calculator 2113 selects one region from the achromatic color region divided into the first predetermined number of regions and the chromatic color regions divided into the second predetermined number of regions by the region division process, and calculates the representative color of the selected region (step S140). For example, the first representative color calculator 2113 calculates the simple average and the weighted average of the pixel values of the pixels belonging to the rectangular parallelepiped corresponding to the selected region, to calculate the representative color. The first representative color calculator 2113 assigns an index value (for example, serial numbers starting from 1) to the calculated representative color to generate index information. Thus, the first representative color calculator 2113 calculates representative colors, one by one, in each of the regions obtained by dividing the achromatic color region into the first predetermined number of regions, and thus, calculates a first predetermined number of representative colors. Similarly, the first representative color calculator 2113 calculates representative colors, one by one, in each of the regions obtained by dividing the chromatic color regions into the second predetermined number of regions, and thus, calculates a second predetermined number of representative colors.

Figure 10:
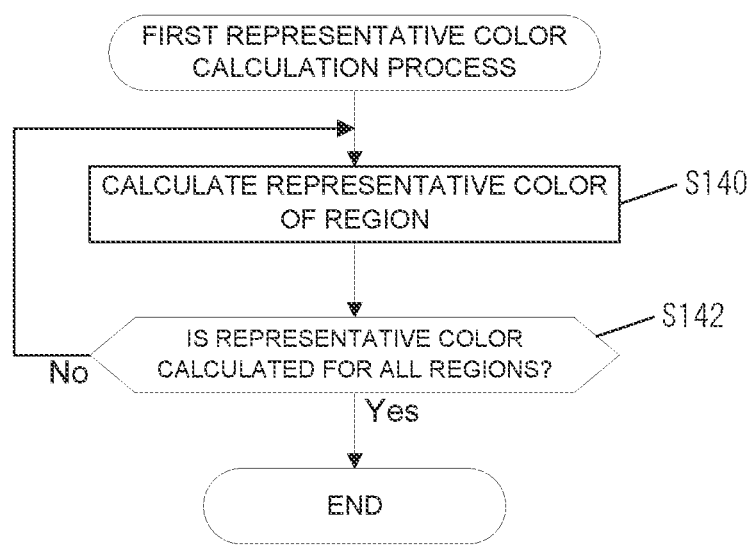
FIG. 10 is a flowchart for describing a flow of a first representative color calculation process according to the first embodiment.

If the first representative color calculator 2113 calculates the representative colors in all regions including the achromatic color region divided into the first predetermined number of regions and the chromatic color regions divided into the second predetermined number of regions by the region division process, the processing illustrated in FIG. 10 ends (step S142; Yes), and otherwise, the processing returns to step S140 (step S142; No→step S140). The first representative color calculator 2113 outputs index information in which the representative color and the index value are associated with each other.

1.2.6 Output Image Generation Process

The flow of the output image generation process will be described with reference to FIG. 11. The output image generation process is executed by the output image generator 2114.

First, the output image generator 2114 selects one pixel (a target pixel) from the input image. The output image generator 2114 selects, from the first predetermined number of representative colors and the second predetermined number of representative colors, a representative color having a pixel value with the smallest (closest) color difference from the pixel value of the target pixel (step S160).

Subsequently, the output image generator 2114 replaces the pixel value of the target pixel with the index value corresponding to the selected representative color (step S162). Thus, the output image generator 2114 replaces the target pixel with a pixel of the representative color having a color tone closest to the target pixel. If the process of replacing all the pixels of the input image with the index values is completed, the output image generator 2114 ends the processing illustrated in FIG. 11 (step S164; Yes), and otherwise, the processing returns to step S160 (step S164; No→step S160).

For example, the output image generator 2114 outputs an image in which the color of each pixel in the input image is replaced with a representative color from the index value and the index information. The output image generator 2114 may output the index information and the input image in which the colors of the pixels are replaced with the index value. In this case, for example, the compression processor 213 generates compressed data from the index value and the index information output from the output image generator 2114.

1.3 Operation Examples

Figure 12B:
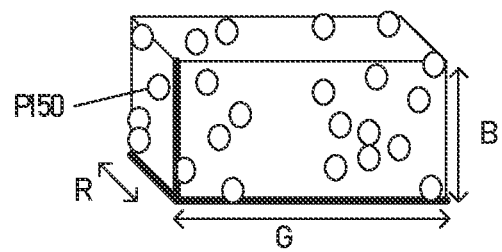

Operation examples according to the present embodiment will be described with reference to FIGS. 12A to 12D. FIG. 12A is a table showing examples of maximum values and minimum values on each axis of the rectangular parallelepiped corresponding to the achromatic color region and the chromatic color regions. FIGS. 12A to 12D are a table and diagrams illustrating examples when the L* a* b* color space is used in the color reduction process.

D140 in FIG. 12A shows the maximum value and the minimum value of a brightness axis and the absolute value of the difference (absolute difference value) between the maximum value and the minimum value in the rectangular parallelepiped of the achromatic color region. D142 in FIG. 12A shows the maximum value, the minimum value, and the absolute difference value of the L* axis in the rectangular parallelepiped corresponding to the divided region of the first chromatic color. Similarly, D144 in FIG. 12A shows the maximum value, the minimum value, and the absolute difference value of the a* axis in the rectangular parallelepiped corresponding to the divided region of the first chromatic color, and D146 shows the maximum value, the minimum value, and the absolute difference value of the b* axis in the rectangular parallelepiped corresponding to the divided region of the first chromatic color. The maximum value, the minimum value, and the absolute difference value are calculated for each of the L* axis, the a* axis, and the b* axis, also in the case of rectangular parallelepipeds corresponding to the divided regions of the second to eighth chromatic colors.

In the process of dividing the rectangular parallelepiped, sides having a large absolute difference value are selected. For example, in FIG. 12A, the absolute difference value in D142 is larger than the other absolute difference values. In this case, a side corresponding to the L* axis of the rectangular parallelepiped corresponding to the divided region of the first chromatic color is selected, and the rectangular parallelepiped corresponding to the divided region of the first chromatic color is divided at a predetermined position on the side. Thus, the rectangular parallelepiped is repeatedly divided, and representative colors are calculated from each of the divided achromatic color region and chromatic color regions.

Figure 12C:
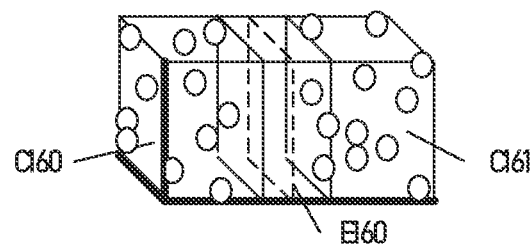
Figure 12D:
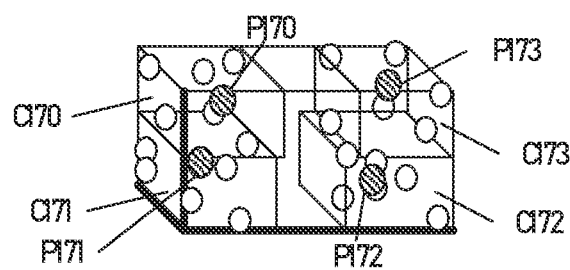

FIGS. 12B to 12D are diagrams illustrating operation examples of the median cut method. In FIGS. 12B to 12D, it is assumed that the color space used in the color reduction process is the RGB color space.

FIG. 12B is a diagram illustrating a rectangular parallelepiped having the largest absolute difference value among the rectangular parallelepipeds corresponding to the regions into which the pixels are classified. P150 is a pixel included in the rectangular parallelepiped. Here, the pixels included in the input image are classified into pixels of achromatic color/chromatic color, and thus, the rectangular parallelepiped includes pixels of achromatic color or close to achromatic color, or includes pixels of chromatic color.

Here, in FIG. 12B, the side having the largest absolute difference value is the side corresponding to the G axis. FIG. 12C is a diagram illustrating a division position E160 on the side corresponding to the G axis. The division position E160 is, for example, a position (position of the median value) where (maximum value−minimum value)/2 is satisfied on the side corresponding to the G axis. The rectangular parallelepiped is divided at the position of the division position E160. The maximum value and the minimum value for each axis in the color space are calculated for the pixels included in the divided regions, and a rectangular parallelepiped is set in the color space consisting of the maximum value and the minimum value of each axis, and thus, a rectangular parallelepiped C160 and a rectangular parallelepiped C161 in FIG. 12C are obtained.

Such a process is repeated to divide the rectangular parallelepiped. When the number of rectangular parallelepipeds is equal to the color reduction number, the representative color is calculated from each rectangular parallelepiped. For example, as illustrated in FIG. 12D, a representative color 170 is calculated from a rectangular parallelepiped C170, a representative color 171 is calculated from a rectangular parallelepiped C171, a representative color 172 is calculated from a rectangular parallelepiped C172, and a representative color 173 is calculated from a rectangular parallelepiped C173. Here, as described above, before being divided, the rectangular parallelepiped includes pixels of achromatic color or close to achromatic color, or includes pixels of chromatic color. Therefore, for example, if the rectangular parallelepiped before being divided is a rectangular parallelepiped including pixels of chromatic color, the representative color is calculated by pixels other than the pixels of achromatic color or close to achromatic color, and thus, the representative color can be used to suppress chroma desaturation due to pixels of achromatic color.

As described above, according to the present embodiment, the pixels included in the input image are classified into pixels of chromatic color and achromatic color by the initial classification process, and then, the representative color can be calculated using the median cut method. As a result, in the present embodiment, in the region division process, regions can be independently divided into each of achromatic colors and chromatic colors, so that it is possible to avoid a coexistence of an achromatic color and a chromatic color in one region. If the representative color is calculated from a region where the achromatic color and the chromatic color do not coexist, it is possible to prevent chroma desaturation of the chromatic color due to the achromatic color.

According to the present embodiment, the initial classification process makes it as easy as possible for the pixels included in the input image to be classified into the region to which pixels of the same color belong, so that it is possible to calculate an appropriate representative color. As a result, in the present embodiment, it is possible to obtain a color reduction result with good image quality.

According to the present embodiment, a chromatic color region that does not include pixels of achromatic color is divided into a plurality of divided regions, so that colors with a hue are likely to remain as representative colors (are easily calculated).

2. Second Embodiment

Next, a second embodiment will be described. In the second embodiment, the number of regions into which the pixels are classified in the initial classification process is different from the number in the first embodiment.

In the first embodiment, the initial classifier 2111 divides the color space used in the color reduction process into one achromatic color region and eight divided regions of chromatic color. However, the initial classifier 2111 may divide the color space into regions different from the one achromatic color region and the eight divided regions of chromatic color.

For example, the achromatic color region may include two or more divided regions. If the number of divided regions of achromatic color is four, the initial classifier 2111 divides the achromatic color region into the following regions, for example.

(1) Region where lightness (brightness) is 0% or more and less than 25%
(2) Region where lightness (brightness) is 25% or more and less than 50%
(3) Region where lightness (brightness) is 50% or more and less than 75%
(4) Region where lightness (brightness) is 75% or more In this case, four divided regions are set for the achromatic color. In the above description, the brightness is 0% if the color of the target pixel is pure black, and the brightness is 100% if the color of the target pixel is pure white. For example, in the RGB color space, if the values that the R value, the G value, and the B value may take are from 0 to 255, a pixel having a brightness of 0% is a pixel in which the R value, the G value, and the B value are all 0. On the other hand, a pixel having a brightness of 100% is a pixel in which the R value, the G value, and the B value are all 255.

If the number of achromatic color regions into which the pixels are to be classified in the initial classification process is 2 or more, ranges of the regions do not need to be ranges obtained by evenly dividing the lightness (brightness), as described below.

(1) Region where lightness (brightness) is 0% or more and less than 15%
(2) Region where lightness (brightness) is 15% or more and less than 50%
(3) Region where lightness (brightness) is 50% or more and less than 85%
(4) Region where lightness (brightness) is 85% or more Similarly, it is only required that the number of chromatic color regions is 1 or more. For example, the number of chromatic color regions may be 16 or may be 1. The range of the divided regions of chromatic color may be a range different from that of the first embodiment. For example, if the color space used in the color reduction process is the L* a* b* color space, the YCbCr color space, or the LCH color space, an angle of the divided regions of chromatic color may be different from the angle in the first embodiment.

The number of divided regions of achromatic color, the number of divided regions of chromatic color, the color reduction number, and the range of the divided regions may be set by the user or may be set in advance. The number of divided regions of achromatic color, the number of divided regions of chromatic color, the color reduction number, and the range of the divided regions may be determined by the type of the document and the color mode. In this case, the storage 60 stores a setting table in which a combination of the type of the document and the color mode of the image data to be output is associated with the color reduction number, the number of achromatic color regions, and the division angle when the chromatic color region is divided in a radial pattern. An example of such a setting table is shown in FIG. 13A.

For example, FIG. 13A shows a setting table in which the color reduction number, the achromatic color number (the number of divided regions of achromatic color), an angle (division angle) of a plane (for example, the a* b* plane) in a case where regions of chromatic color are classified into divided regions having a radial shape, and the threshold value TH1 are associated with each of a mode of the document (document type) and a color mode.

If the document type is a map and the color mode is color, D200 in FIG. 13A indicates that the color reduction number is 16, the achromatic color number is 5, the division angle is "30.75, 120, 165, 210, 255, 300, 345", and the threshold value TH1 is 5. In this case, in the initial classification process, one achromatic color region and eight divided regions of chromatic color are set, and in the region division process, the achromatic color region is divided into five regions and the chromatic color regions are divided into 11 regions, to calculate 16 representative colors.

Here, the divided regions of chromatic color into which the pixels are classified in the initial classification process, based on information about the division angle, are the following eight regions.

(1) Region where 30°≤θ<75°
(2) Region where 75°≤θ<120°
(3) Region where 120°≤θ<165°
(4) Region where 165°≤θ<210°
(5) Region where 210°≤θ<255°
(6) Region where 255°≤θ<300°
(7) Region where 300°≤θ<345°
(8) Region where 345°≤θ<390° (region where 0°≤θ<30° and 345°≤θ<360°)

In this case, in the initial classification process, the initial classifier 2111 classifies the pixels by setting one divided region of achromatic color and eight divided regions of chromatic color as the regions into which the pixels of the input image are to be classified. In the initial classification process, the initial classifier 2111 further classifies a pixel in which both the absolute value of the a* value and the absolute value of the b* value are 5 or less, as a pixel of achromatic color. Thus, the initial classifier 2111 executes, as the initial classification process, the processing illustrated in FIG. 13B, obtained by adding a process (step S200) of dividing the region of achromatic color to the processing in FIGS. 5, 7, 8E, and 8F, and replacing step S102 with a process (step S202) of classifying a pixel by determining to which of the divided regions of achromatic color the pixel belongs.

The region divider 2112 repeats the process of dividing the regions until the achromatic color region is divided into five regions and the chromatic color region is divided into 11 regions in the region division process. As a result, the achromatic color region and the chromatic color region are divided into a total of 16 regions. If the first representative color calculation process and the output image generation process are executed in a case where the document type is a map and the color mode is color, the pixels included in the input image are replaced with any color of 16 representative colors.

The setting table shown in FIG. 13A may include a range of the divided regions of achromatic color. In this case, in the initial classification process, the divided regions of achromatic color are set based on the information stored in the setting table.

As described above, according to the present embodiment, it is possible to flexibly set the number and range of the divided regions of achromatic color and the number and range of the divided regions of chromatic color in the initial classification process.

3. Third Embodiment

Next, a third embodiment will be described. The third embodiment is an embodiment in which a representative color is calculated by using a K-means method. In the present embodiment, FIGS. 3A and 3B in the first embodiment are replaced with FIGS. 14A and 14B. The same functional elements are designated by the same reference signs and description thereof will be omitted.

3.1 Outline of Processing of Color Number Conversion Processor

In the present embodiment, the color number conversion processor 211 performs an image reduction process on an input color image (input image), and then, divides a color space used in the color reduction process into regions of achromatic color/chromatic color, and further divides the regions of achromatic color and chromatic color into a plurality of regions, according to a condition. The color number conversion processor 211 distributes (classifies) each pixel of the input image to the divided regions. The color number conversion processor 211 determines a representative color for each region of achromatic color/chromatic color by the K-means method, and then, assigns an index value of the representative color closest to each pixel of the input image, to generate a color-reduced image in which the color of the input image is reduced.

3.2 Configuration of Color Number Conversion Processor

A configuration of the color number conversion processor 211 in the present embodiment will be described with reference to FIGS. 14A and 14B. The color number conversion processor 211 in the present embodiment includes the functional elements illustrated in any one of FIG. 14A and FIG. 14B, depending on the color space used in the color reduction process.

(1) If RGB Color Space is Used

Figure 14A:
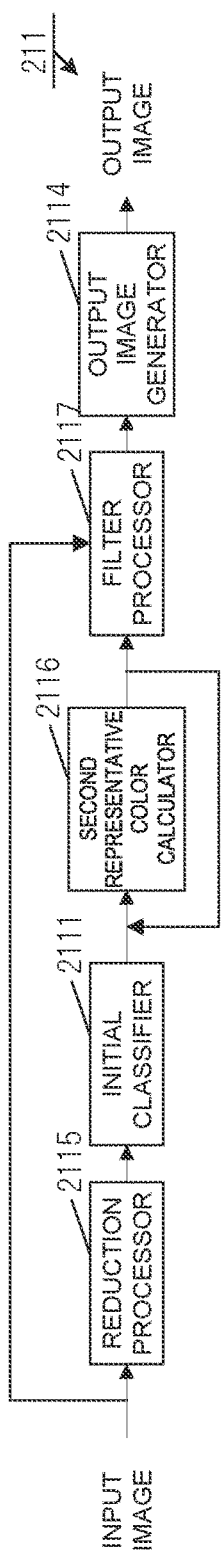
FIGS. 14A and 14B are diagrams for describing a functional configuration of a color number conversion processor according to a third embodiment.

As illustrated in FIG. 14A, the color number conversion processor 211 includes a reduction processor 2115, the initial classifier 2111, a second representative color calculator 2116, a filter processor 2117, and the output image generator 2114.

(2) If Color Space Other than RGB Color Space is Used

Figure 14B:
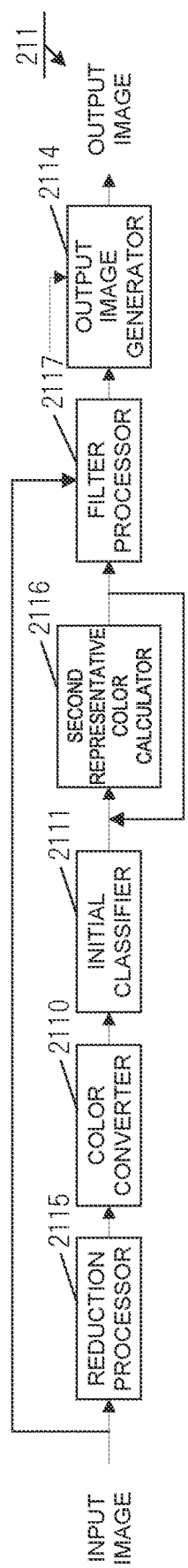

As illustrated in FIG. 14B, the color number conversion processor 211 includes the reduction processor 2115, the color converter 2110, the initial classifier 2111, the second representative color calculator 2116, the filter processor 2117, and the output image generator 2114.

Similarly to the first embodiment, the color converter 2110, the initial classifier 2111, and the output image generator 2114 execute the color conversion process, the initial classification process, and the output image generation process, respectively.

The reduction processor 2115 performs a reduction process of reducing the input image (RGB signal). An existing technique may be used as the method of reducing the image. By executing the image reduction process, it is possible to reduce the processing amount of the K-means method.

The second representative color calculator 2116 executes a second representative color calculation process, which is a process of calculating a representative color by using the K-means method. The second representative color calculation process will be described later.

The filter processor 2117 executes a process of applying an edge-preserving type smoothing filter (bilateral filter) to the input image (hereinafter referred to as a filter process), to make an even region (a region where substantially the same color continues) in the input image as uniform as possible, and output the input image after the filter process.

Here, in a document read by the color image input device 10, even in a color background region without show-through, color unevenness (density unevenness) and brightness unevenness may occur depending on a scan position, and an input image in which the pixel values are not uniform may be generated. In this case, if the representative color is assigned to the input image in this state, a representative color different from the representative color that originally needs to be assigned is assigned, and as a result, the file size increases due to deterioration of image quality and reduction of compression efficiency. Therefore, the color number conversion processor 211 performs a filter process on the input image via the filter processor 2117, so that pixel values of pixels in a region where substantially the same color continues, such as the color background region, are made even. As a result, the color number conversion processor 211 increases the possibility that the same representative color is assigned to the color background region in the output image generation process executed by the output image generator 2114, so that the image quality of the output image is improved and the compression efficiency is increased.

The color number conversion processor 211 executes a reduction process on the RGB signal (input image) output from the output gradation corrector 210, to acquire a reduced image of the input image. Next, if the color space used in the color reduction process is a color space other than the RGB color space, the color number conversion processor 211 uses the color converter 2110 to convert the color space of the reduced image of the input image, and outputs a result of the conversion to the initial classifier 2111. If the color space used in the color reduction process is the RGB color space, the color number conversion processor 211 outputs the reduced image of the input image to the initial classifier 2111. The color number conversion processor 211 acquires a representative color by executing the initial classification process and the second representative color calculation process. The color number conversion processor 211 executes a filter process on the input image, and executes an output image generation process by using the input image after the filter process and the acquired representative color, to generate a color-reduced image of the input image.

Some or all of the reduction processor 2115, the second representative color calculator 2116, and the filter processor 2117 may be implemented by a program executed by the controller 70, or may be implemented by hardware such as a circuit.

3.3 Initial Classification Process

In the present embodiment, the initial classifier 2111 divides regions into which the pixels are classified in the initial classification process, into M regions of achromatic color (M>2, first predetermined number) and N regions of chromatic color (N>2, second predetermined number). For example, the initial classifier 2111 determines the number of divided regions of achromatic color and the number of divided regions of chromatic color, that is, the color reduction number, according to the manual document mode (the document type set by the user) or the automatic document discrimination result being a determination result of the document type determiner 203.

Figure 5:
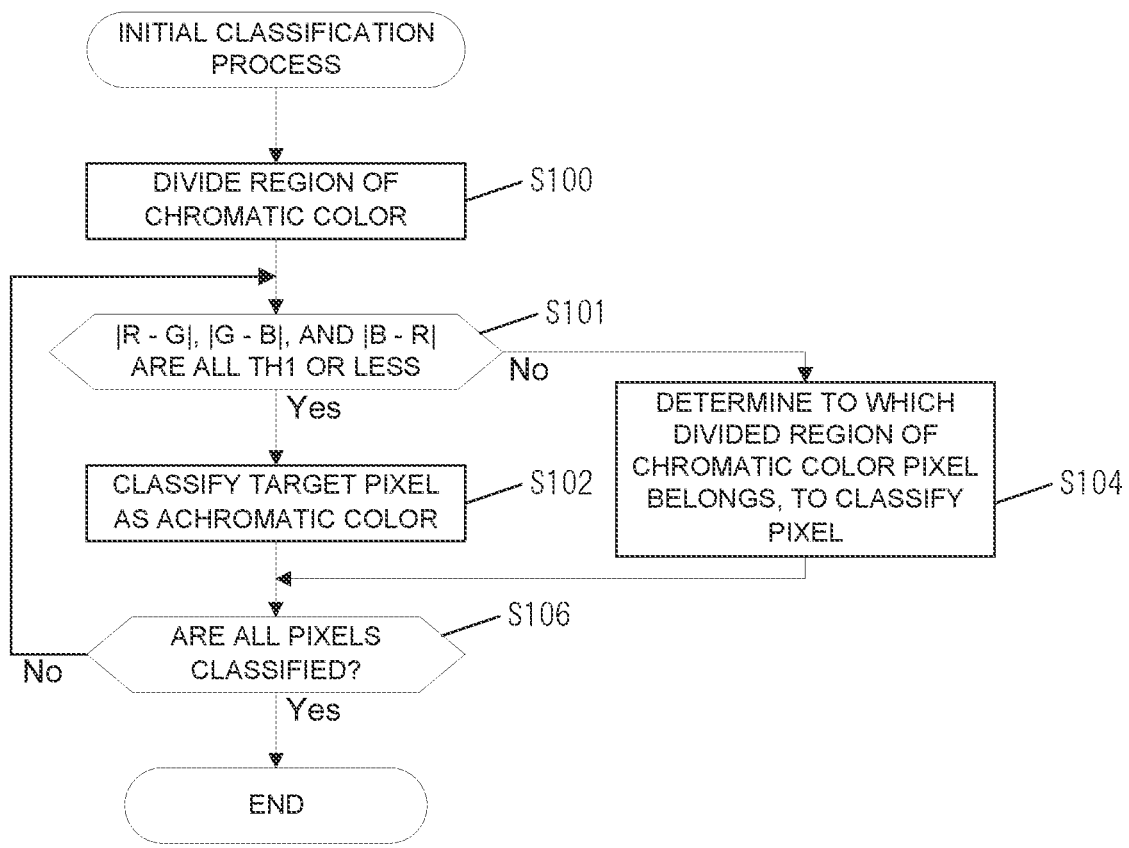
FIG. 5 is a flowchart for describing a flow of an initial classification process (in the case of the RGB color space) in the first embodiment.

The initial classifier 2111 further executes the initial classification process illustrated in FIGS. 4 and 5. Here, the initial classifier 2111 executes, as the process of step S102, a process of determining to which divided region of achromatic color the target pixel belongs, to classify the target pixel. Thus, the initial classifier 2111 can classify the pixels included in the input image into any region of the M divided regions of achromatic color and the N divided regions of chromatic color.

Here, a method of dividing the regions will be described. If the color reduction numbers are "achromatic color=4, chromatic color=16", the initial classifier 2111 divides the achromatic color region into four regions and the chromatic color region into 16 regions. The initial classifier 2111 divides the color space according to the type of the color space used in the color reduction process, as described below.

3.3.1 RGB Color Space

The initial classifier 2111 divides the achromatic color region into M regions at equal intervals within the G values (from 0 to 255). For example, if M=4, the achromatic color region is divided into a region where the G value is from 0 to 63, a region where the G value is from 64 to 127, a region where the G value is from 128 to 191, and a region where the G value is from 192 to 255.

The initial classifier 2111 evenly divides the chromatic color region into eight cubic regions (divided regions) from the eight vertices in the RGB cube. The cubic regions are regions including no achromatic color region. The cubic regions may overlap with other divided regions of chromatic color. The initial classifier 2111 successively divides the eight cubes in a predetermined order until the number of chromatic colors is reached.

Figure 15A:
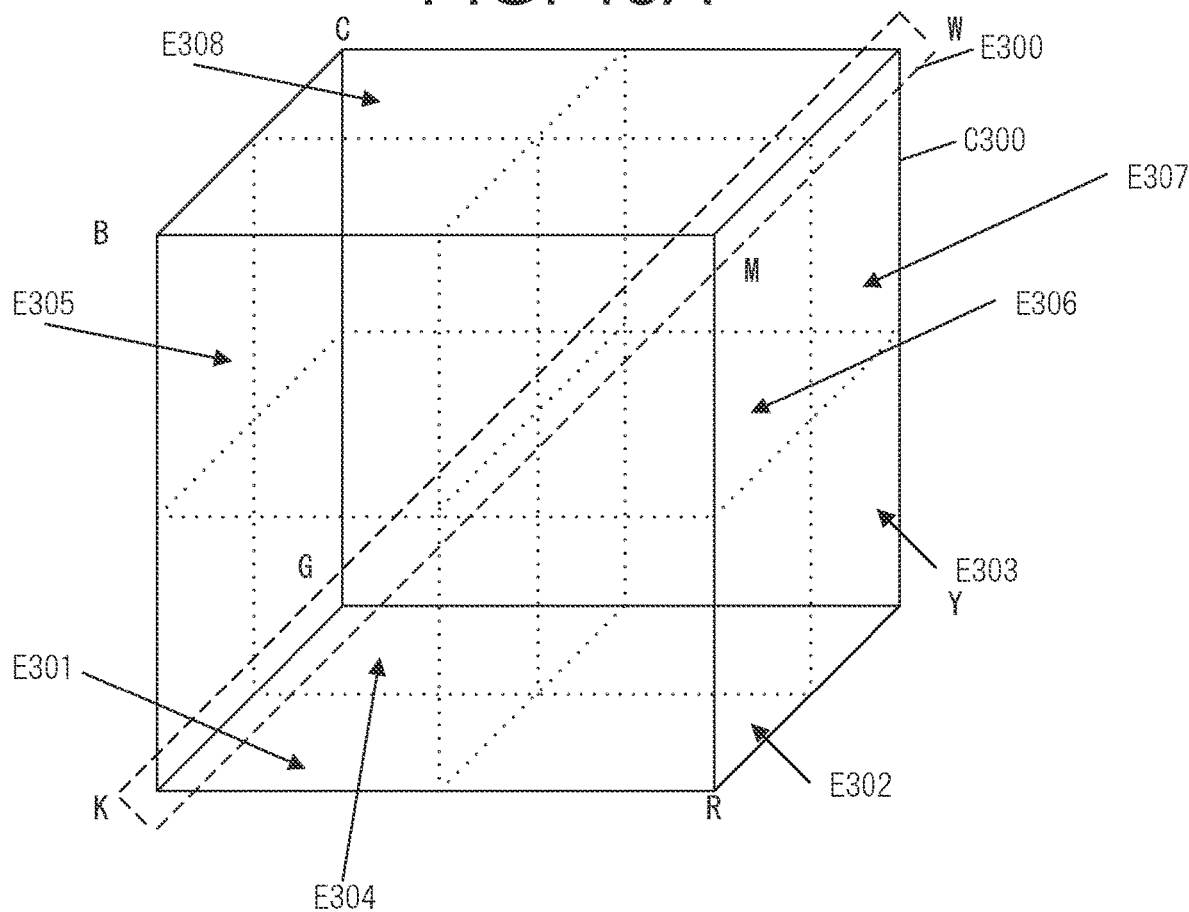
FIGS. 15A to 15D are diagrams for describing specific examples of an initial classifier according to the third embodiment.
Figure 15B:
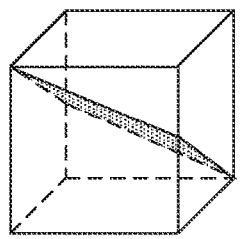
Figure 15C:
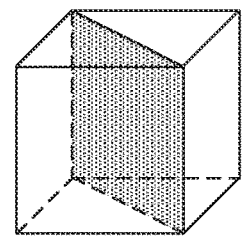

Specific examples corresponding to the above description are illustrated in FIGS. 15A to 15C. FIG. 15A is a diagram illustrating C300 which is an RGB cube. A region E300 in FIG. 15A is an achromatic color region. Regions E301 to E308 in FIG. 15A are regions obtained by evenly dividing the chromatic color region into eight cubes from the eight vertices of C300. Specifically, the eight divided regions of chromatic color are a W region (region E307), a Y region (region E303), an M region (region E306), a C region (region E308), an R region (region E302), a G region (region E304), a B region (region E305), and a K region (region E301).

The initial classifier 2111 sets, for the eight regions into which the chromatic color region is evenly divided, a priority order for dividing the chromatic color region into the W region, the Y region, the M region, the C region, the R region, the G region, the B region, and the K region, in this order, to divide the chromatic color region from a cubic region having the highest priority order. The priority order is not limited to the above-described order. The initial classifier 2111 may divide the cubic region diagonally, as illustrated in FIG. 15B, or vertically, as illustrated in FIG. 15C. For example, the initial classifier 2111 divides the W region into two regions in the vertical or diagonal direction, and then divides the Y region into two regions in the vertical or diagonal direction. Thus, the initial classifier 2111 divides the regions until the number of regions reaches N.

In the method described above, the initial classifier 2111 may divide the eight divided regions of chromatic color into 16 divided regions. If the color reduction number of the chromatic color is 17 or more, the initial classifier 2111 sets a priority order for the 16 divided regions, and divides the divided regions of chromatic color by a predetermined method from the region having the highest priority order.

3.3.2 L* a* b* Color Space, YUV (YCbCr) Color Space, LCH Color Space

The initial classifier 2111 divides the achromatic color region into M regions at equal intervals in a range of values (the L* value, the Y value, and the L value) that the brightness value/lightness value can take.

The initial classifier 2111 divides the a* b* plane, the CbCr plane, and the CH plane into eight regions (divided regions) formed radially from the center. The radially formed regions are regions including no achromatic color region. The radially formed regions may overlap with other divided regions of chromatic color. The eight radially formed regions are divided, following a priority order determined in advance, until the number of regions reaches N.

Figure 15D:
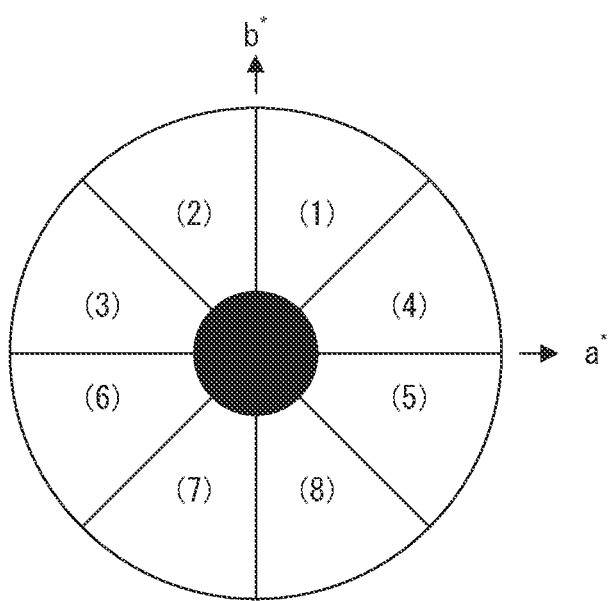

A specific example corresponding to the above description is illustrated in FIG. 15D. The color space in FIG. 15D is the L* a* b* color space. In this case, the initial classifier 2111 sets the priority order in the order from (1) to (8) in FIG. 15D, and divides the regions in order from the region having the highest priority order (for example, to obtain regions of equal size). For example, the initial classifier 2111 divides region (1) in FIG. 15D at a position where the size of the region is halved, and then divides region (2) at a position where the size of the region is halved. Thus, the initial classifier 2111 divides the regions until the number of regions reaches N. The priority order is not limited to the order illustrated in FIG. 15D. Even in the case of the color space used in the color reduction process, the initial classifier 2111 sets the priority order of the divided regions of chromatic color by a predetermined method, similarly to the above description, and divides the divided regions in order from the region having the highest priority order.

In the method described above, the initial classifier 2111 may divide the eight divided regions of chromatic color into 16 divided regions. If the color reduction number of the chromatic color is 17 or more, the initial classifier 2111 sets a priority order for the 16 divided regions, and divides the divided regions of chromatic color by a predetermined method from the region having the highest priority order.

3.4 Second Representative Color Calculation Process

The flow of the second representative color calculation process will be described with reference to FIG. 16. The second representative color calculation process is executed by the second representative color calculator 2116.

First, the second representative color calculator 2116 calculates an initial representative color from each region into which the pixels are classified by the initial classification process (step S300). For example, the second representative color calculator 2116 executes a process that is similar to the processing from step S120 to step S124 in FIG. 9, to set a rectangular parallelepiped corresponding to each region into which the pixels are classified by the initial classification process. The second representative color calculator 2116 calculates, for each set rectangular parallelepiped, a color corresponding to a center position of the rectangular parallelepiped, and a color obtained by determining a simple average or a weighted average of pixel values of pixels belonging to the rectangular parallelepiped, as the initial representative colors.

Here, in the present embodiment, in the initial classification process, the color space used in the color reduction process is divided into M regions corresponding to the first predetermined number in the achromatic color region, and N regions corresponding to the second predetermined number in the chromatic color region. Therefore, the second representative color calculator 2116 calculates representative colors from the M regions and the N regions, to calculate M types (first predetermined number) of initial representative colors from the achromatic color region and N types (second predetermined number) of initial representative colors from the chromatic color region. For example, if the color reduction numbers are "achromatic color=4, chromatic color=16", the second representative color calculator 2116 calculates, in step S300, four initial representative colors from the pixels classified into the achromatic color region, and 16 initial representative colors from the pixels classified into the chromatic color region.

Subsequently, the second representative color calculator 2116 selects one pixel (target pixel) from the input image, compares a pixel value of the target pixel with the pixel values of the plurality of representative colors, and classifies (clusters) the target pixel into a group, based on the representative color having the pixel value closest to the target pixel (step S302). Here, the second representative color calculator 2116 ensures that the group of achromatic colors consists of the pixels of achromatic color, and the group of chromatic colors consists of the pixels of chromatic color. Specifically, the second representative color calculator 2116 compares the pixel values of the pixels included in the achromatic color region with the pixel values of a plurality of representative colors calculated from the achromatic color region, to classify the pixels included in the achromatic color region into any group, based on the representative colors calculated from the achromatic color region. Similarly, the second representative color calculator 2116 compares the pixel values of the pixels included in the chromatic color region with the pixel values of a plurality of representative colors calculated from the chromatic color region, to classify the pixels included in the chromatic color region into any group, based on the representative colors calculated from the chromatic color region. That is, the second representative color calculator 2116 ensures that the pixels of the achromatic color region and the pixels of the chromatic color region are always included in different groups.

The second representative color calculator 2116 determines whether all the pixels included in the input image are classified (step S304), and if not all of the pixels are classified, the processing returns to step S302 (step S304; No→step S302).

Subsequently, the second representative color calculator 2116 classifies all the pixels included in the input image into groups, based on any one of the representative colors, and then, calculates a new representative color for each group (step S304; Yes→step S306). The method of calculating the representative color is similar to that of step S300.

Next, the second representative color calculator 2116 determines whether a process of repeatedly executing the process in step S306 a prescribed number of times is completed (step S308). If the process in step S306 is not executed a prescribed number of times, the second representative color calculator 2116 returns the processing to step S302 (step S308; No→step S302). On the other hand, if the process in step S306 is executed a prescribed number of times, the second representative color calculator 2116 ends the process illustrated in FIG. 16 (step S308; Yes). Thus, the second representative color calculator 2116 updates the initial representative color calculated in step S300 by repeatedly executing the process in step S306.

Figure 16:
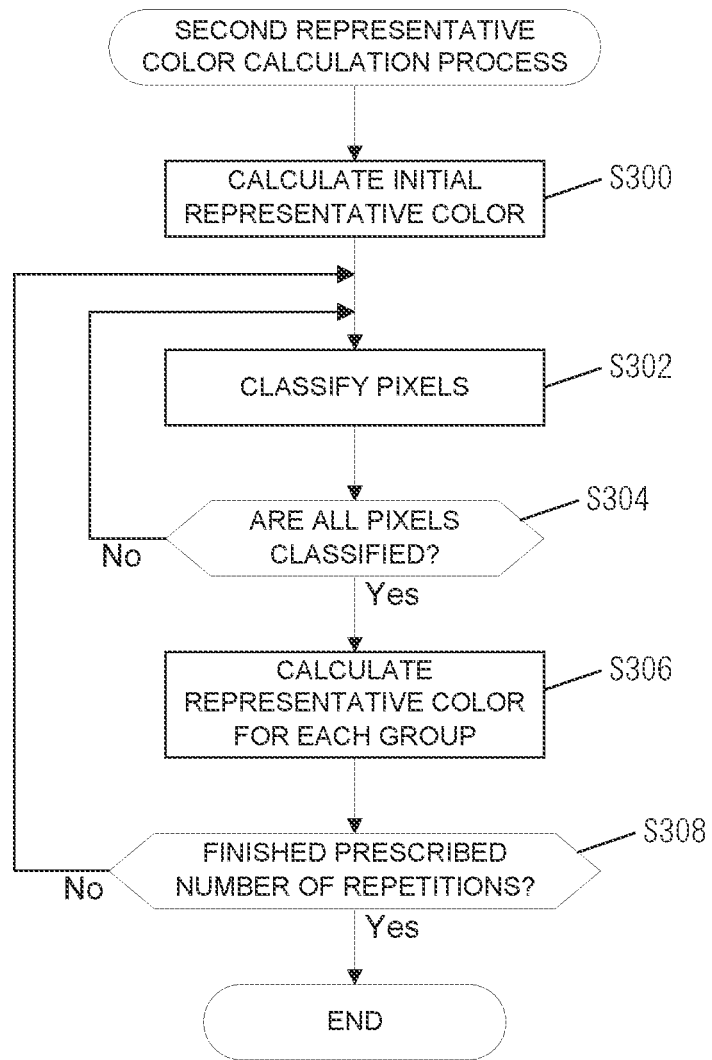
FIG. 16 is a flowchart for describing a second representative color calculation process according to the third embodiment.

The process in step S308 may be a process of ending the processing illustrated in FIG. 16, if the color difference between the newly calculated representative color and the representative color before the calculation is smaller than a predetermined color difference. Thus, the second representative color calculator 2116 uses a color corresponding to the center position of the rectangular parallelepiped and the like as an initial value of the representative color, applies the K-means method only to pixels belonging to each of the rectangular parallelepipeds, and repeatedly executes the process of calculating the representative color, to calculate a final representative color. The second representative color calculator 2116 outputs index information in which the final representative color and the index value are associated with each other.

3.5 Output Image Generation Process

The output image generator 2114 executes the output image generation process illustrated in FIG. 11. In the present embodiment, the output image generator 2114 selects a target pixel from the input image after the filter process is executed, and further selects, from the representative colors, the representative color having the smallest (closest) color difference from the target pixel. In step S162, the output image generator 2114 replaces the pixel value of the target pixel with an index value corresponding to the representative color selected in step S160.

3.6 Operation Examples

Figure 17A:
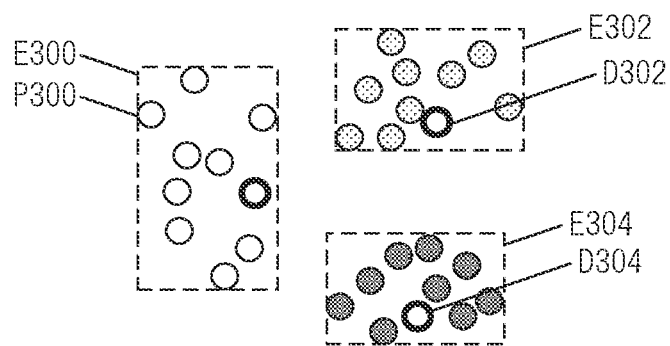
FIGS. 17A to 17C are diagrams for describing operation examples according to the third embodiment.
Figure 17B:
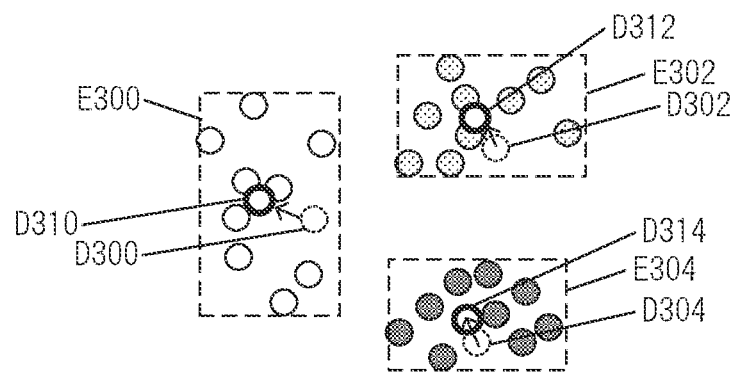

Operation examples of the present embodiment will be described with reference to FIGS. 17A to 17C. FIG. 17A is a diagram illustrating initial representative colors. For example, an initial representative color D300 is a representative color calculated based on a rectangular parallelepiped set corresponding to any one region into which pixels are classified by the initial classification process. The region E300 is a region including pixels close to the initial representative color D300, among pixels (for example, P300) included in the input image. Similarly, the region E302 is a region consisting of pixels belonging to the same group as an initial representative color D302, and the region E304 is a region consisting of pixels belonging to the same group as an initial representative color D304. Here, the pixels illustrated in FIGS. 17A to 17C are any one of pixels other than pixels of achromatic color or close to achromatic color, and pixels of chromatic color.

The representative color is calculated based on the pixels included in each region. For example, as illustrated in FIG. 17B, a new representative color D310 is calculated from the pixels belonging to the region E300. Thus, the initial representative color D300 is replaced with the new representative color D310. Similarly, a new representative color D312 is calculated from the region E302 and replaces the initial representative color D302. A new representative color D314 is calculated from the region E304 and replaces the initial representative color D304. Here, the pixels included in the region E300, the region E302, and the region E304 are any one of pixels other than pixels of achromatic color or close to achromatic color, and pixels of chromatic color. Thus, in each region, the chromatic color and the achromatic color do not mix, and as a result, it is possible to avoid chroma desaturation of the representative color and fluctuations of the representative color.

Figure 17C:
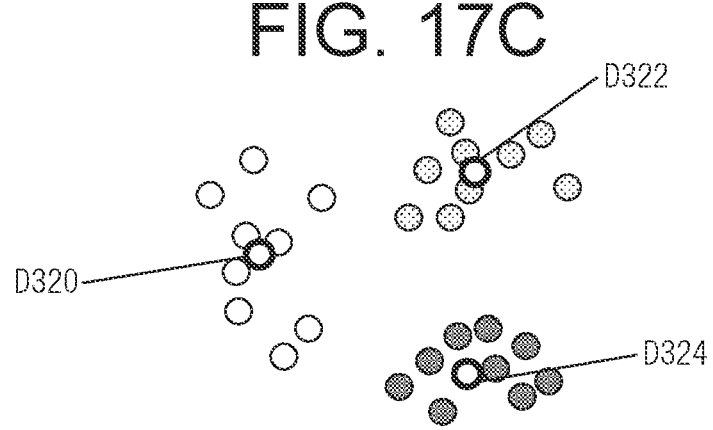

If the process of calculating the representative color is executed a predetermined number of times, or if the color difference between the newly calculated representative color and the representative color before the calculation is smaller than a predetermined color difference, a final representative color D320, a final representative color D322, and a final representative color D324 are determined, as illustrated in FIG. 17C.

As described above, according to the present embodiment, the representative color can be determined for each achromatic color/chromatic color by using the K-means method. As a result, it is possible to avoid the problem that the chroma of the representative color is desaturated. Pixels of achromatic color and pixels of chromatic color do not coexist within a group, and thus, it is possible to prevent fluctuations of the representative color and to quickly determine the representative color.

According to the present embodiment, the processing speed can be increased by applying the K-means method to an image obtained by reducing the input image. In the present embodiment, even if the representative color is assigned to an image having an image size of an output resolution, it is possible to suppress density unevenness and brightness unevenness by an edge-preserving type smoothing filter, so that a representative color can be uniformly assigned to an even region. As described above, by the image forming apparatus of the present embodiment, it is possible to achieve both an improvement in the image quality of the output image and a reduction of the file size.

4. Fourth Embodiment

Next, a fourth embodiment will be described. In the present embodiment, the representative color calculated in the color reduction process by the median cut method is used as an initial value to calculate the final representative color by using the K-means method.

4.1 Outline of Processing of Color Number Conversion Processor

In the present embodiment, the color number conversion processor 211 divides, in the input color image (input image), a color space used in the color reduction process into regions of achromatic color/chromatic color, and further distributes (classifies) each pixel of the input image to each region of a plurality of regions obtained by dividing the region of chromatic color according to a condition. The color number conversion processor 211 determines a representative color for each achromatic color/chromatic color by the median cut method, and then, uses the representative color as an initial value to determine the final representative color by the K-means method. The color number conversion processor 211 assigns, to each pixel of the input image, an index value of the representative color closest to the pixel, to generate a color-reduced image in which the color of the input image is reduced.

4.2 Configuration of Color Number Conversion Processor

A configuration of the color number conversion processor 211 in the present embodiment will be described with reference to FIGS. 18A and 18B. The color number conversion processor 211 in the present embodiment includes the functional elements illustrated in any one of FIG. 18A and FIG. 18B, depending on the color space used in the color reduction process.

(1) If RGB Color Space is Used

Figure 18A:
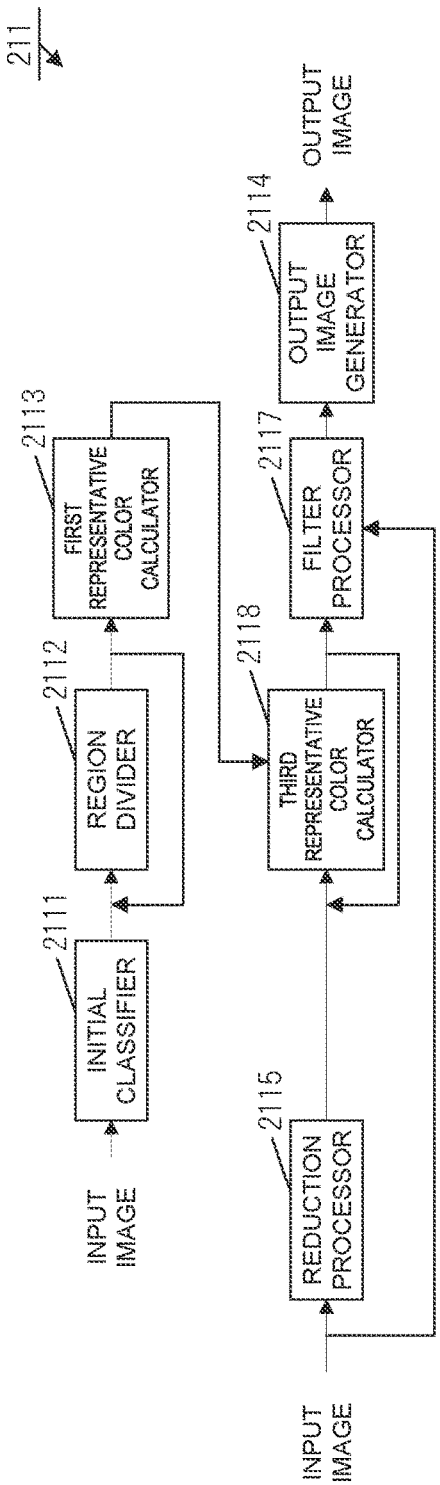
FIGS. 18A and 18B are charts for describing a functional configuration of a color number conversion processor in a fourth embodiment.

As illustrated in FIG. 18A, the color number conversion processor 211 includes the initial classifier 2111, the region divider 2112, the first representative color calculator 2113, the reduction processor 2115, a third representative color calculator 2118, the filter processor 2117, and the output image generator 2114.

(2) If Color Space Other than RGB Color Space is Used

Figure 18B:
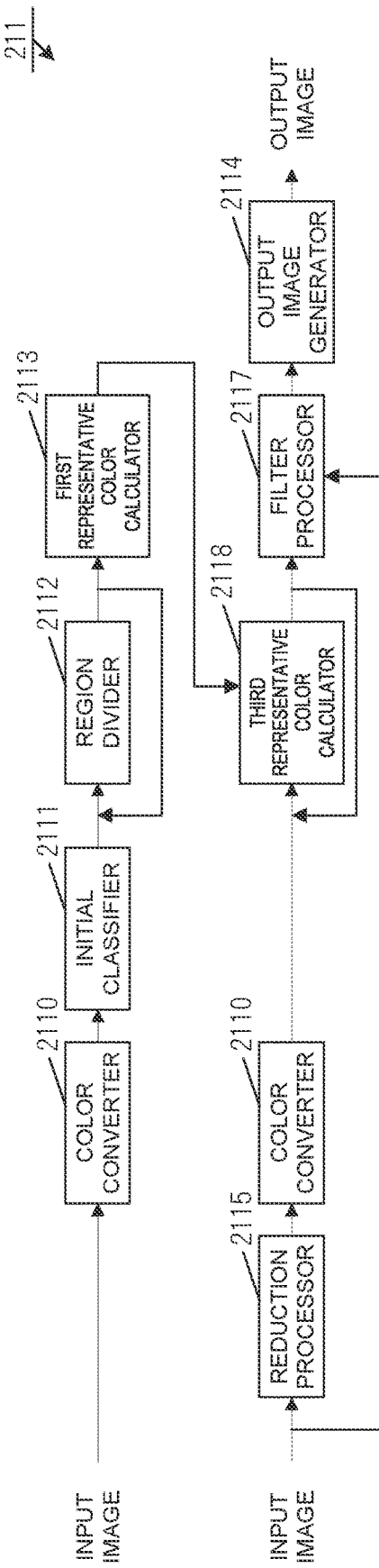

As illustrated in FIG. 18B, the color number conversion processor 211 includes the color converter 2110, the initial classifier 2111, the region divider 2112, the first representative color calculator 2113, the reduction processor 2115, the third representative color calculator 2118, the filter processor 2117, and the output image generator 2114.

The third representative color calculator 2118 executes a third representative color calculation process of updating, by the K-means method, the representative color acquired by the first representative color calculation process as an initial representative color, and calculating a final representative color. The third representative color calculation process will be described later. The third representative color calculator 2118 may be implemented by a program executed by the controller 70, or may be implemented by hardware such as a circuit.

Similarly to the first embodiment, the color converter 2110, the initial classifier 2111, the first representative color calculator 2113, and the output image generator 2114 execute the color conversion process, the initial classification process, the first representative color calculation process, and the output image generation process, respectively. Similarly to the third embodiment, the reduction processor 2115 and the filter processor 2117 execute the reduction process and the filter process, respectively.

If the color number conversion processor 211 changes the color space of the RGB signal (input image) output from the output gradation corrector 210, the color number conversion processor 211 changes the color space to a color space of a reduced image of the input image, and then, outputs the input image to the initial classifier 2111. The color number conversion processor 211 executes the region division process and the first representative color calculation process on the input image to calculate a first predetermined number of representative colors from pixels classified into regions of achromatic color, and a second predetermined number of representative colors from pixels classified into regions of chromatic color, by using the median cut method. The color number conversion processor 211 outputs the representative color calculated by the first representative color calculation process to the third representative color calculator 2118.

If the color number conversion processor 211 executes a reduction process on the RGB signal (input image) output from the output gradation corrector 210, to change the color space, the color number conversion processor 211 changes the color space to a color space of a reduced image of the input image, and then, outputs the processed input image to the third representative color calculator 2118.

The color number conversion processor 211 executes the third representative color calculation process to update, based on the processed input image, the first predetermined number of representative colors and the second predetermined number of representative colors calculated by the first representative color calculation process, and to calculate a final representative color.

The color number conversion processor 211 executes a filter process on the input image, and executes an output image generation process by using the input image after the filter process and the representative color calculated by the third representative color calculation process, to generate a color-reduced image of the input image.

4.3 Third Representative Color Calculation Process

Subsequently, the third representative color calculation process will be described with reference to FIG. 19. The third representative color calculation process is executed by the third representative color calculator 2118. The third representative color calculation process is a process of calculating a representative color by using the K-means method.

Here, the image input to the third representative color calculator 2118 is an input image reduced by the reduction processor 2115. If the color space used in the color reduction process is not the RGB color space, the input image reduced by the reduction processor 2115 is converted into pixel values of the color space used in the color reduction process by the color converter 2110, and then, is input to the third representative color calculator 2118.

First, the third representative color calculator 2118 sets, as an initial representative color, the representative color obtained as output from the first representative color calculator 2113 (step S400). Subsequently, the third representative color calculator 2118 selects one pixel (target pixel) from the input image, compares the pixel value of the target pixel with the pixel values of the plurality of representative colors, and classifies (clusters) the target pixel into a group, based on the representative color having the pixel value closest to the target pixel (step S402). The third representative color calculator 2118 classifies the pixels included in the achromatic color region into any group, based on the representative color calculated from the achromatic color region, and classifies pixels included in the chromatic color region into any group, based on the representative color calculated from the chromatic color region. The third representative color calculator 2118 determines whether all the pixels included in the input image are classified (step S404), and if not all of the pixels are classified, the processing returns to step S402 (step S404; No→step S402).

The third representative color calculator 2118 classifies all the pixels included in the input image into groups based on any one of the representative colors, and then, calculates a representative color for each group (step S404; Yes→step S406). Subsequently, the third representative color calculator 2118 determines whether a process of repeatedly executing the process in step S406 a prescribed number of times is completed (step S408). If the process in step S406 is not executed a prescribed number of times, the third representative color calculator 2118 returns the processing to step S402 (step S408; No→step S402). On the other hand, if the process in step S406 is executed a prescribed number of times, the third representative color calculator 2118 ends the process illustrated in FIG. 19 (step S408; Yes). Thus, the third representative color calculator 2118 uses the representative color output from the first representative color calculator 2113 as the initial representative color, to update the representative color by repeatedly executing the process in step S406. The third representative color calculator 2118 outputs the representative color.

As described above, the image forming apparatus of the present embodiment uses the representative color calculated by the median cut method as the initial representative color, to update the representative color by the K-means method. Here, the initial representative color is a color calculated based on the pixels included in the input image, and is a color that reflects a color distribution of the input image. The representative color is calculated by the K-means method from such a state, and thus, it is unlikely that the representative color changes significantly or fluctuates. Therefore, according to the present embodiment, it is possible to rapidly optimize the representative color.

Even if the representative color is assigned to an image having an image size of an output resolution, it is possible to suppress density unevenness and brightness unevenness by an edge-preserving type smoothing filter, so that a representative color can be uniformly assigned to an even region, and thus, it is possible to improve the image quality of the output image. As described above, by the image forming apparatus of the present embodiment, it is possible to achieve both an improvement in the image quality of the reduced image and a reduction of the file size.

5. Fifth Embodiment

Figure 20:
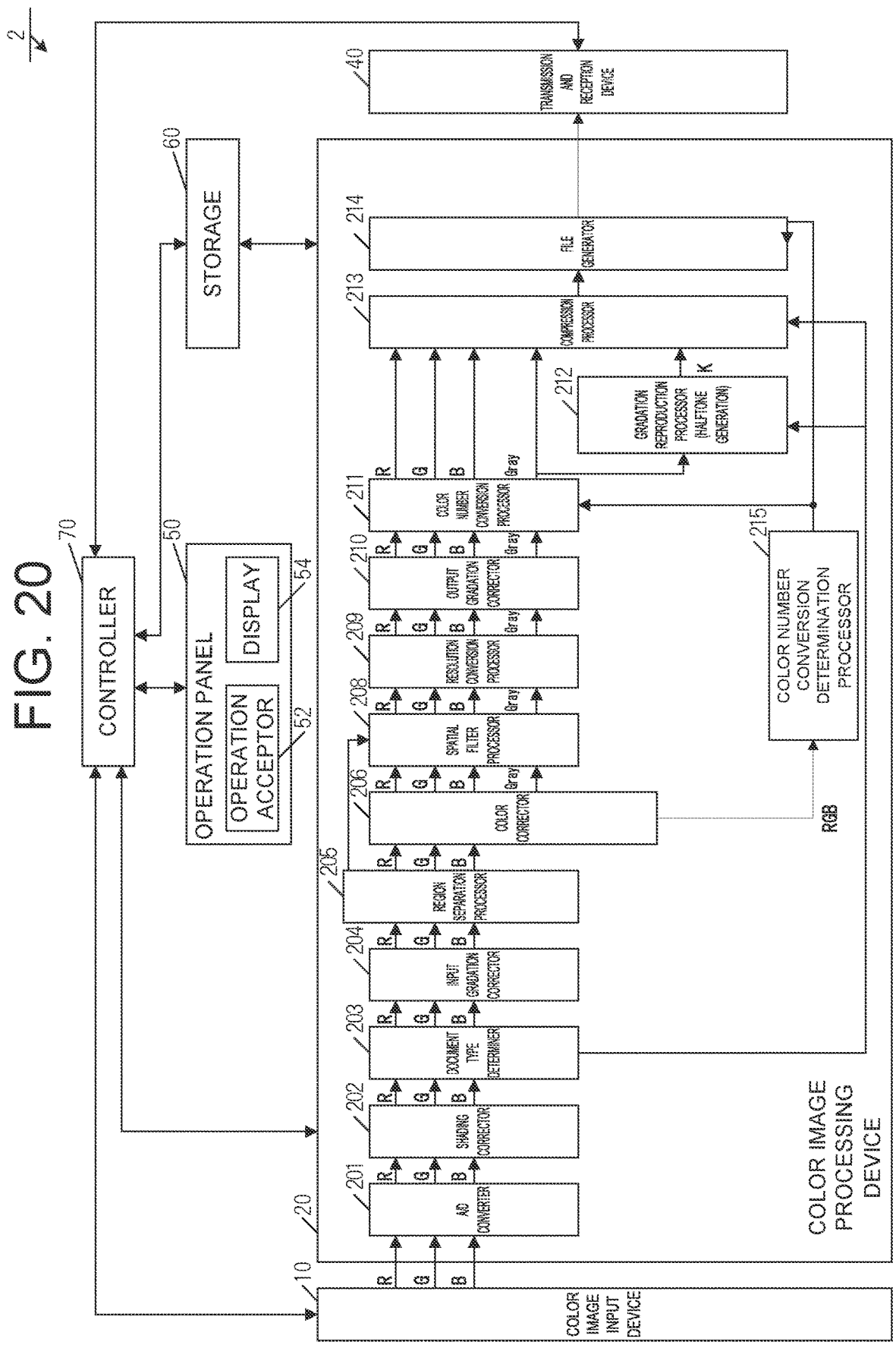
FIG. 20 is a diagram for describing a functional configuration of an image reading apparatus according to a fifth embodiment.

Next, a fifth embodiment will be described. The fifth embodiment is an embodiment realized by an image reading apparatus. In the present embodiment, FIG. 2 in the first embodiment is replaced with FIG. 20. The same functional elements are designated by the same reference signs and description thereof will be omitted.

In the first to fourth embodiments, a case where the image forming apparatus 1 includes the color image processing device 20 that executes the color reduction process is described. However, the color image processing device 20 may be provided in a device other than the image forming apparatus 1. An example in which the color image processing device 20 described in the first to fourth embodiments is applied to an image processing device included in an image reading apparatus 2 such as a flatbed scanner will be described.

FIG. 19 is a block diagram illustrating a functional configuration of the image reading apparatus 2 in the present embodiment. As illustrated in FIG. 19, the image reading apparatus 2 includes the color image input device 10, the color image processing device 20, the transmission and reception device 40, the operation panel 50, the storage 60, and the controller 70.

In the present embodiment, color image processing device 20 includes the A/D converter 201, the shading corrector 202, the document type determiner 203, the input gradation corrector 204, the region separation processor 205, the color corrector 206, the spatial filter processor 208, the resolution conversion processor 209, the output gradation corrector 210, the color number conversion processor 211, the gradation reproduction processor 212, the compression processor 213, the file generator 214, and the color number conversion determination processor 215. The color number conversion processor 211 executes a similar processing to the processing described in the first to fourth embodiments.

Various processes executed by the image reading apparatus 2 are controlled by the controller 70 (a computer including a processor such as a CPU (Central Processing Unit) or a DSP (Digital Signal Processor)) provided in the image reading apparatus 2.

The image reading apparatus 2 is not limited to a scanner, and may be, for example, an electronic device (such as a mobile phone, a smartphone, and a tablet terminal) equipped with a camera such as a digital still camera. The processing executed by the color image processing device 20 may be executed by a server device (an image processing device via a network), for example.

6. Modification

The present disclosure is not limited to the above-described embodiments, and may be modified in various ways. That is, embodiments obtained by combining technical members appropriately changed within the scope not departing from the gist of the present disclosure are also included in the technical scope of the present disclosure.

Although the above-described embodiments have portions described separately for convenience of description, it is needless to say that the embodiments may be combined and executed within a technically possible range.

In the above-described embodiment, the color reduction process is realized by an image forming apparatus or an image processing device. However, the color reduction process described in the present embodiment may be realized as program executed by a PC (Personal Computer) or a server device. For example, a web service that realizes the color reduction process described in the present embodiment may be deployed in a server device installed on the Internet. In this case, it is only required that the server device uses an image received from another device as an input image to execute the color reduction process, and provides the color-reduced image in a format that can be downloaded from the other device.

A program operating in each of the devices in the embodiments is a program (a program for causing a computer to function) for controlling a CPU and the like to realize the functions of the above-described embodiments. Information processed by these devices is temporarily stored in a temporary storage device (such as a RAM) at the time of processing the information, and then stored in storage devices such as various types of ROMs (Read Only Memory) and HDDs, and read or corrected and written by the CPU, as necessary.

Here, examples of a storage medium for storing the program may include a semiconductor medium (such as a ROM and a non-volatile memory card), an optical recording medium/magneto-optical recording medium (such as a DVD (Digital Versatile Disc), an MO (Magneto Optical Disc), an MD (Mini Disc), a CD (Compact Disc), and a BD (Blu-ray (registered trademark) Disk)), and a magnetic recording medium (such as magnetic tape and a flexible disk). In addition to a case where the functions of the above-described embodiments are realized by executing the loaded program, there may be a case where the functions of the present disclosure are realized as a result of processing that is based on the instructions of the program and performed in cooperation with an operating system, another application program, or the like.

If the program is distributed to a market, the program may be stored in a portable storage medium to be distributed, or the program may be transferred to a server computer connected via a network such as the Internet. In this case, of course, a storage device of the server computer is also included in the present disclosure.

What is claimed is:

1. An image generation apparatus, comprising:
a memory; and
a processor connected to the memory to execute a program including computer-readable instructions that are stored in the memory, wherein
the processor
classifies each of pixels included in an image into any one region of a region of achromatic color inside a color space and a region of chromatic color inside the color space,
uses the pixels classified into the region of achromatic color to extract a first predetermined number of representative colors, uses the pixels classified into the region of chromatic color to extract a second predetermined number of representative colors,
replaces each of the pixels included in the image with a pixel of a representative color having a smallest difference in pixel value from the pixels included in the image, among the first predetermined number of representative colors and the second predetermined number of representative colors, to generate a color-reduced image of the image,
uses a median cut method to divide the region of achromatic color until a number of regions is the first predetermined number and to divide the region of chromatic color until the number of regions is the second predetermined number, and uses the median cut method to calculate a representative color of each region obtained by dividing the region of chromatic color and the region of achromatic color,
updates the representative color by a K-means method, and replaces each of the pixels included in the image with a pixel of the representative color having a smallest difference in pixel value from the pixels included in the image, among the representative colors that are updated, to generate the color-reduced image of the image.

2. The image generation apparatus according to claim 1, wherein the color space is an RGB color space, and if an absolute value of a difference between an R value and a G value, an absolute value of a difference between the G value and a B value, and an absolute value of a difference between the B value and the R value of the pixel are all within a threshold value, the processor classifies the pixel into the region of achromatic color, and otherwise, classifies the pixel into the region of chromatic color.

3. The image generation apparatus according to claim 1, wherein the color space is an L* a* b* color space, and if both an absolute value of an a* value and an absolute value of a b* value of the pixel are within a threshold value, the processor classifies the pixel into the region of achromatic color, and otherwise, classifies the pixel into the region of chromatic color.

4. The image generation apparatus according to claim 1, wherein the color space is a YCbCr color space, and if both an absolute value of a Cb value and an absolute value of a Cr value of the pixel are within a threshold value, the processor classifies the pixel into the region of achromatic color, and otherwise, classifies the pixel into the region of chromatic color.

5. The image generation apparatus according to claim 1, wherein the processor divides the region of chromatic color into a plurality of divided regions, and if a pixel of the pixels included in the image is a pixel of chromatic color, classifies the pixel into any one of the plurality of divided regions of the region of chromatic color.

6. The image generation apparatus according to claim 5, wherein the processor divides the region of achromatic color into a plurality of divided regions, and if a pixel of the pixels included in the image is a pixel of achromatic color, classifies the pixel into any one of the plurality of divided regions of the region of achromatic color.

7. The image generation apparatus according to claim 1, wherein the processor calculates the first predetermined number of representative colors and the second predetermined number of representative colors, classifies a pixel of the pixels included in the image into a group of representative colors having a pixel value closest to the pixel, among the first predetermined number of representative colors and the second predetermined number of representative colors, and uses a pixel value of the pixel that is classified to calculate a new representative color for each group, to update the first predetermined number of representative colors and the second predetermined number of representative colors.

8. The image generation apparatus according to claim 1, wherein the processor uses an RGB color space as the color space, if the color-reduced image is generated with emphasis on speed, uses an L* a* b* color space as the color space, if the color-reduced image is generated with emphasis on color reproduction, and uses a YCbCr color space as the color space, if the color-reduced image is generated in consideration of balancing speed and color reproduction.

9. The image generation apparatus according to claim 8, wherein the processor allows for selection by a user of a color space used to generate the color-reduced image.

10. A control method of an image generation apparatus, the control method comprising:

classifying each of pixels included in an image into any one region of a region of achromatic color inside a color space and a region of chromatic color inside the color space;

using the pixels classified into the region of achromatic color to extract a first predetermined number of representative colors, using the pixels classified into the region of chromatic color to extract a second predetermined number of representative colors;

replacing each of the pixels included in the image with a pixel of a representative color having a smallest difference in pixel value from the pixels included in the image, among the first predetermined number of representative colors and the second predetermined number of representative colors, to generate a color-reduced image of the image;

using a median cut method to divide the region of achromatic color until a number of regions is the first predetermined number and to divide the region of chromatic color until the number of regions is the second predetermined number, and using the median cut method to calculate a representative color of each region obtained by dividing the region of chromatic color and the region of achromatic color;

updating the representative color by a K-means method; and replacing each of the pixels included in the image with a pixel of the representative color having a smallest difference in pixel value from the pixels included in the image, among the representative colors that are updated, to generate the color-reduced image of the image.

11. A non-transitory storage medium for storing a program including computer-readable instructions, when executed by a processor, that cause the processor to:

classify each of pixels included in an image into any one region of a region of achromatic color inside a color space and a region of chromatic color inside the color space;

use the pixels classified into the region of achromatic color to extract a first predetermined number of representative colors, use the pixels classified into the region of chromatic color to extract a second predetermined number of representative colors;

replace each of the pixels included in the image with a pixel of a representative color having a smallest difference in pixel value from the pixels included in the image, among the first predetermined number of representative colors and the second predetermined number of representative colors, to generate a color-reduced image of the image;

use a median cut method to divide the region of achromatic color until a number of regions is the first predetermined number and to divide the region of chromatic color until the number of regions is the second predetermined number, and use the median cut method to calculate a representative color of each region obtained by dividing the region of chromatic color and the region of achromatic color;

update the representative color by a K-means method; and replace each of the pixels included in the image with a pixel of the representative color having a smallest difference in pixel value from the pixels included in the image, among the representative colors that are updated, to generate the color-reduced image of the image.

* * * * *